US011438869B2

(12) United States Patent
Bao et al.

(10) Patent No.: US 11,438,869 B2
(45) Date of Patent: Sep. 6, 2022

(54) USER EQUIPMENT POSITIONING SIGNAL MEASUREMENT AND/OR TRANSMISSION

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/327,061

(22) Filed: May 21, 2021

(65) Prior Publication Data

US 2021/0377906 A1 Dec. 2, 2021

Related U.S. Application Data

(60) Provisional application No. 63/030,991, filed on May 28, 2020.

(51) Int. Cl.
*H04W 24/10* (2009.01)
*H04W 64/00* (2009.01)
(Continued)

(52) U.S. Cl.
CPC ......... *H04W 64/006* (2013.01); *H04L 5/0051* (2013.01); *H04W 24/10* (2013.01); *H04W 92/18* (2013.01)

(58) Field of Classification Search
CPC ... H04W 64/00; H04W 64/006; H04W 24/00; H04W 24/10; H04W 92/18; H04W 92/20;
(Continued)

(56) References Cited

U.S. PATENT DOCUMENTS 9,852,155 B2 * 12/2017 Huang .................... H04W 4/30
2011/0312345 A1   12/2011 Nam
(Continued)

OTHER PUBLICATIONS

Intel Corporation: "Analysis of D2D Aided User Positioning", 3GPP Draft, R1-152636, 3GPP TSG RAN WG1 Meeting #81, Intel —OTDOA+D2D, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25-May 29, 2015, May 16, 2015 (May 16, 2015), XP050973153, pp. 1-7, Retrieved from the Internet: URL: http://www.3gpp.org/ftp/tsg_ran/WG1_RL1/TSGR1_81/Docs/ [retrieved on May 16, 2015] the Whole Document.

(Continued)

*Primary Examiner* — Siu M Lee
(74) *Attorney, Agent, or Firm* — Hunter Clark PLLC

(57) ABSTRACT

A method of initiating positioning reference signal exchange includes: determining, at a first user equipment, a null-zone presence of the first user equipment, the null-zone presence of the first user equipment being at least one of a current presence of the first user equipment in a null zone or a future presence of the first user equipment in the null zone; and transmitting, from the first user equipment and in response to determining the null-zone presence of the first user equipment, a request for positioning reference signal exchange between the first user equipment and a second user equipment separate from the first user equipment.

24 Claims, 13 Drawing Sheets

(51) Int. Cl.
*H04L 5/00* (2006.01)
*H04W 92/18* (2009.01)

(58) Field of Classification Search
CPC ..... H04W 92/22; H04W 92/24; H04W 76/14; H04L 5/0051; H04L 5/005
See application file for complete search history.

(56) References Cited

U.S. PATENT DOCUMENTS

2016/0337805 A1* 11/2016 Liao ............... H04W 8/005
2019/0239181 A1* 8/2019 Gangakhedkar ...... H04W 64/00
2022/0015057 A1* 1/2022 Bao ............... H04W 64/00

OTHER PUBLICATIONS

Intel Corporation: "Discussion on D2D Assisted Positioning", 3GPP Draft, R1-151445, 3GPP TSG RAN WG1 Meeting #80bis, Intel—OTDOA+D2D, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20-24, 2015, Apr. 11, 2015 (Apr. 11, 2015), XP050949991, pp. 1-6, Retrieved from the Internet: URL:http://www.3gpp.org/ftp/tsg_ran/WG1_RL1/TSGR1_80b/Docs/ [retrieved on Apr. 11, 2015] the Whole Document.
International Search Report and Written Opinion—PCT/US2021/033919—ISA/EPO—dated Sep. 23, 2021.

* cited by examiner

USER EQUIPMENT POSITIONING SIGNAL MEASUREMENT AND/OR TRANSMISSION

CROSS-REFERENCE TO RELATED APPLICATION

This application claims the benefit of U.S. Provisional Application No. 63/030,991, filed May 28, 2020, entitled "USER EQUIPMENT POSITIONING SIGNAL MEASUREMENT AND/OR TRANSMISSION," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5 G and 2.75 G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example first user equipment configured for wireless signal exchange includes: a transceiver; a memory; and a processor, communicatively coupled to the transceiver and the memory, and configured to: determine a null-zone presence of the first user equipment, the null-zone presence of the first user equipment being at least one of a current presence of the first user equipment in a null zone or a future presence of the first user equipment in the null zone; and transmit, via the transceiver in response to determining the null-zone presence of the first user equipment, a request for positioning reference signal exchange between the first user equipment and a second user equipment separate from the first user equipment.

Another example first user equipment configured for wireless signal exchange includes: means for determining a null-zone presence of the first user equipment, the null-zone presence of the first user equipment being at least one of a current presence of the first user equipment in a null zone or a future presence of the first user equipment in the null zone; and means for transmitting, in response to determining the null-zone presence of the first user equipment, a request for positioning reference signal exchange between the first user equipment and a second user equipment separate from the first user equipment.

An example method of initiating positioning reference signal exchange includes: determining, at a first user equipment, a null-zone presence of the first user equipment, the null-zone presence of the first user equipment being at least one of a current presence of the first user equipment in a null zone or a future presence of the first user equipment in the null zone; and transmitting, from the first user equipment and in response to determining the null-zone presence of the first user equipment, a request for positioning reference signal exchange between the first user equipment and a second user equipment separate from the first user equipment.

An example non-transitory, processor-readable storage medium includes processor-readable instructions configured to cause a processor of a first user equipment, in order to initiate positioning reference signal exchange, to: determine a null-zone presence of the first user equipment, the null-zone presence of the first user equipment being at least one of a current presence of the first user equipment in a null zone or a future presence of the first user equipment in the null zone; and transmit, in response to determining the null-zone presence of the first user equipment, a request for positioning reference signal exchange between the first user equipment and a second user equipment separate from the first user equipment.

An example network entity includes: a transceiver; a memory; and a processor, communicatively coupled to the transceiver and the memory, and configured to: determine a null-zone presence of a first user equipment, the null-zone presence of the first user equipment being at least one of a current presence of the first user equipment in a null zone or a future presence of the first user equipment in the null zone; and at least one of: transmit, via the transceiver in response to determining the null-zone presence of the first user equipment, an availability request for availability of a second user equipment for positioning reference signal exchange with the first user equipment; or transmit, via the transceiver in response to determining the null-zone presence of the first user equipment, a positioning reference signal configuration for a third user equipment for positioning reference signal exchange between the first user equipment and the third user equipment, the third user equipment being separate from the first user equipment.

Another example network entity includes: determining means for determining a null-zone presence of a first user equipment, the null-zone presence of the first user equipment being at least one of a current presence of the first user equipment in a null zone or a future presence of the first user equipment in the null zone; and at least one of: first transmitting means for transmitting, in response to determining the null-zone presence of the first user equipment, an availability request for availability of a second user equipment for positioning reference signal exchange with the first user equipment; or second transmitting means for transmitting, in response to determining the null-zone presence of the first user equipment, a positioning reference signal configuration for a third user equipment for positioning reference signal exchange between the first user equipment and the third user equipment, the third user equipment being separate from the first user equipment.

An example method for initiating positioning reference signal exchange includes: determining, at a network entity, a null-zone presence of a first user equipment, the null-zone presence of the first user equipment being at least one of a current presence of the first user equipment in a null zone or a future presence of the first user equipment in the null zone; and at least one of: transmitting, in response to determining the null-zone presence of the first user equipment, an availability request for availability of a second user equipment for positioning reference signal exchange with the first user equipment; or transmitting, in response to determining the null-zone presence of the first user equipment, a positioning reference signal configuration for a third user equipment for positioning reference signal exchange between the first user equipment and the third user equipment, the third user equipment being separate from the first user equipment.

Another example non-transitory, processor-readable storage medium includes processor-readable instructions configured to cause a processor of a network entity, in order to initiate positioning reference signal exchange, to: determine a null-zone presence of a first user equipment, the null-zone presence of the first user equipment being at least one of a current presence of the first user equipment in a null zone or a future presence of the first user equipment in the null zone; and at least one of: transmit, in response to determining the null-zone presence of the first user equipment, an availability request for availability of a second user equipment for positioning reference signal exchange with the first user equipment; or transmit, in response to determining the null-zone presence of the first user equipment, a positioning reference signal configuration for a third user equipment for positioning reference signal exchange between the first user equipment and the third user equipment, the third user equipment being separate from the first user equipment.

DETAILED DESCRIPTION

Figure 1:
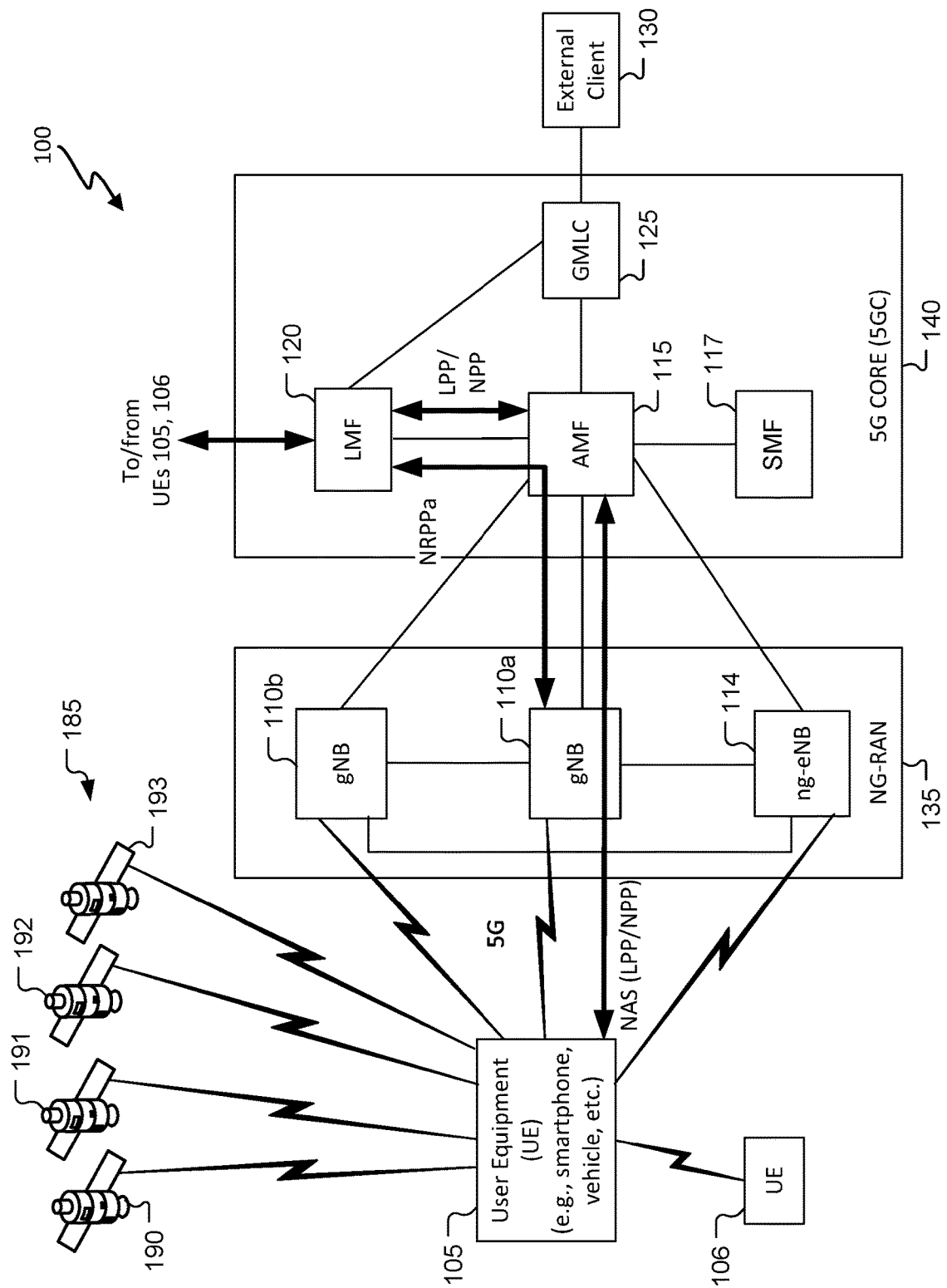
FIG. 1 is a simplified diagram of an example wireless communications system.

Techniques are discussed herein for determining location of a target user equipment (UE) based on exchanging one or more positioning reference signals (PRS) between the target UE and one or more anchor UEs, in response to determining that the target UE is or will be in a null zone. The UE-UE PRS exchange may be triggered by the target UE or by another entity such as a location server. For example, a target UE or a location management function (e.g., in a server or base station) may determine that the target UE is, or will be in the future, in a null zone where insufficient base station positioning reference signals are available to achieve desired positioning accuracy (e.g., positioning uncertainty below a desired threshold). In response to this determination, one or more UEs may be identified as anchor UEs to serve as reference points and to exchange one or more positioning reference signals with the target UE to provide (or supplement) positioning measurements for determining the location of the target UE. To be identified (selected) as an anchor UE, a UE may need to have a location uncertainty below a threshold uncertainty and/or have a likelihood of line of sight with the target UE above a threshold likelihood. These are examples, and other examples may be implemented.

Items and/or techniques described herein may provide one or more of the following capabilities, as well as other capabilities not mentioned. Accuracy of an estimated location of a UE may be improved. An estimated location of a UE may be determined despite the UE being disposed in a null zone where insufficient base station positioning reference signals are received by the UE to determine the location of the UE with a desired accuracy. Positioning reference signal overhead may be offloaded from a location management function and/or base station to UE-to-UE communications, e.g., in a sidelink channel Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
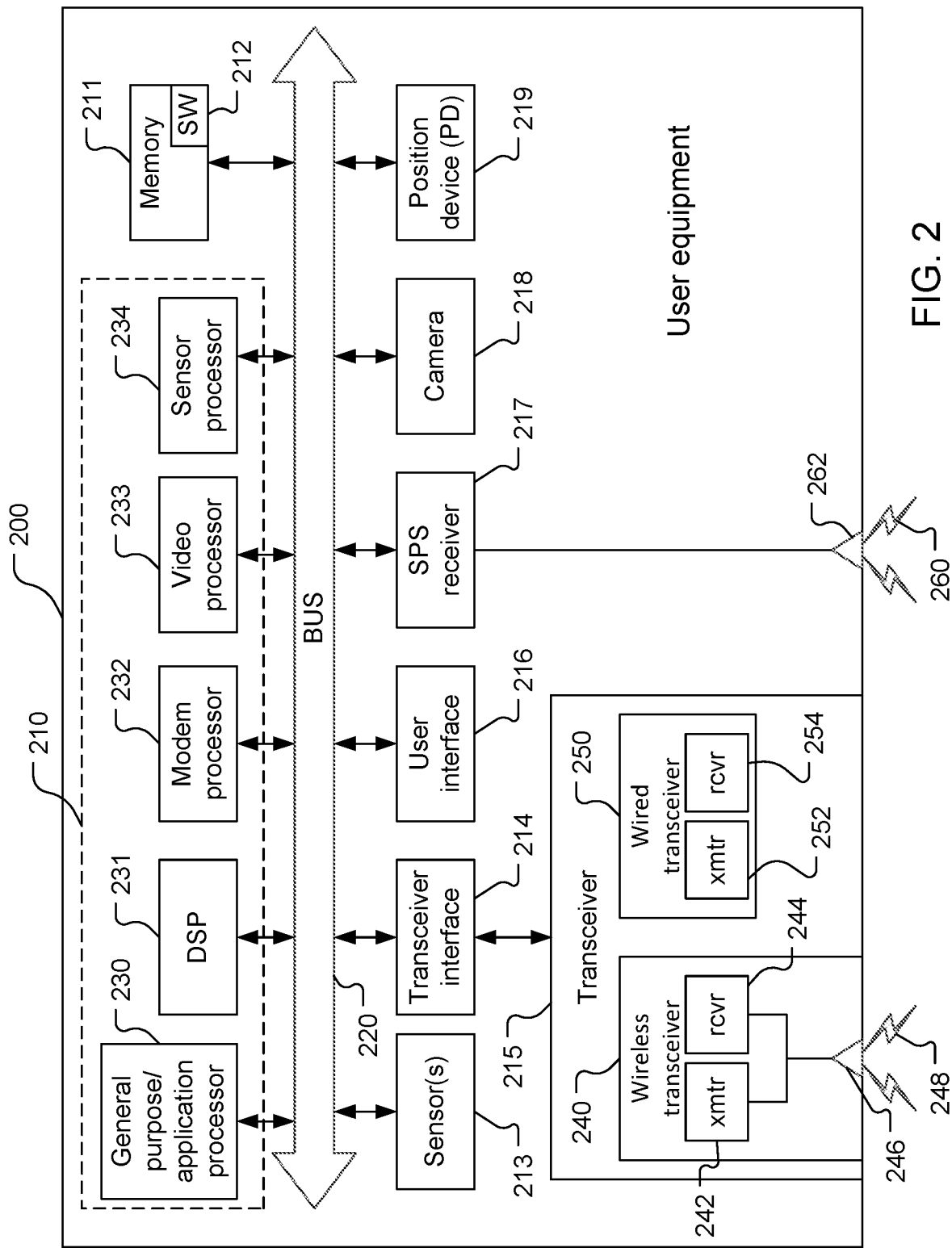
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/ measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
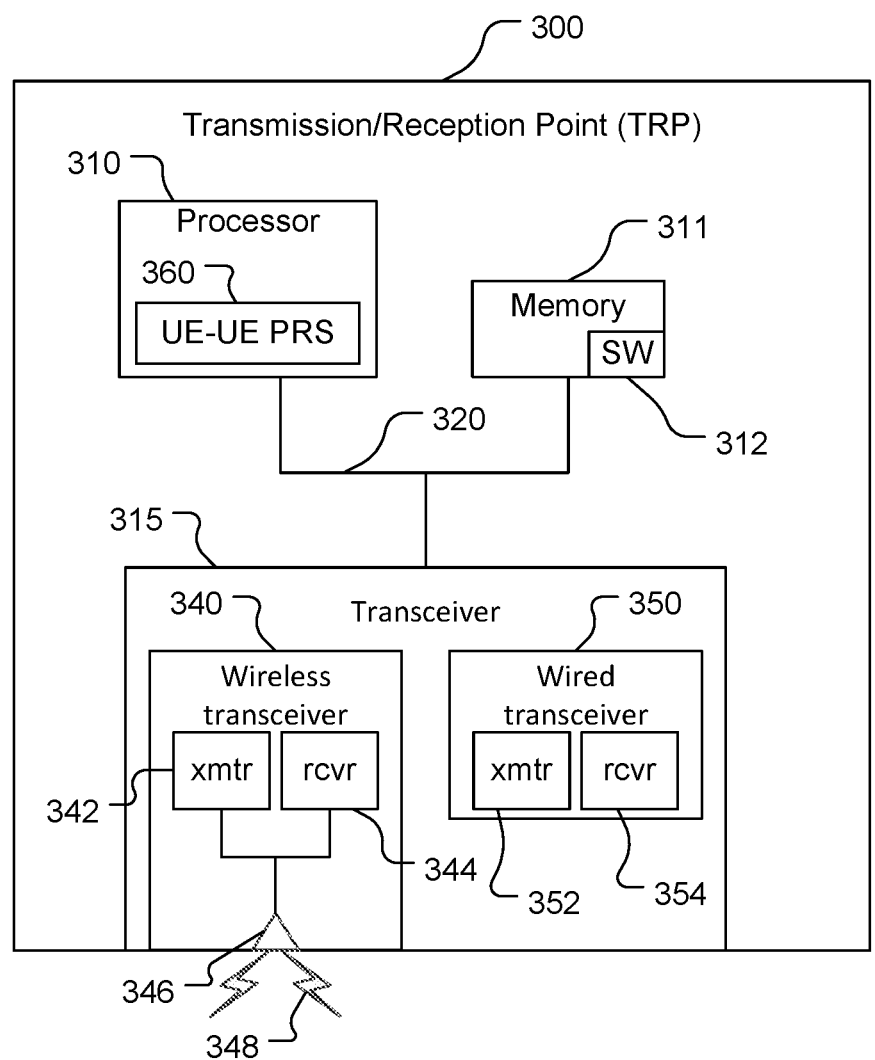
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
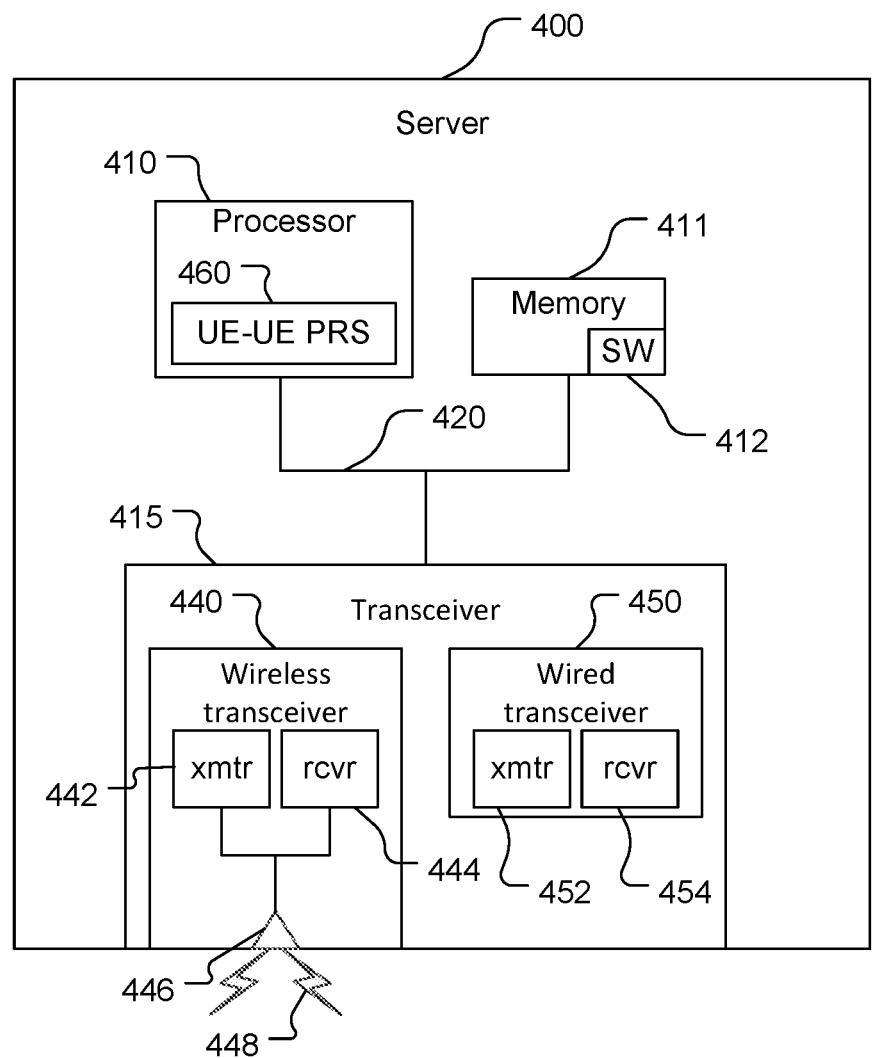
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

UE-UE PRS Measurement and/or Transmission

Positioning accuracy (i.e., the accuracy of a determined position estimate) may be improved in a variety of ways. For example, positioning accuracy may improve as more measurements relative to more reference points (e.g., more TRPs) are obtained. Networks may be deployed with a quantity of TRPs and locations of TRPs based on expected communication needs, not based on positioning accuracy. A network configured for communication may not provide sufficient positioning accuracy. For example, there may be null zones defined by boundaries within which there are insufficient PRS, e.g., insufficient line-of-sight (LOS) PRS, available from base stations to determine a location of a UE, at least with adequate accuracy. For example, if a unique two-dimensional location is desired, then at least three distinct signals need to be measured. Even if three signals are available, however, an adequate accuracy may still not be achievable, e.g., if time information for one or more of the signals is unacceptably inaccurate. What constitutes adequate accuracy of a location may depend on the application (e.g., use case) and/or circumstances. For example, while outdoors for use in a sports tracking app (e.g., walking, hiking, swimming, etc.) an accuracy of 1 m may be adequate (acceptable), indoors for use in an equipment tracking app (e.g., for items on an assembly line) an accuracy of 20 cm or less may be desired. These are examples, and countless other accuracy thresholds are possible. Also, a UE may have a good communication link with a serving base station while the UE is in a null zone.

A greater quantity of base stations, and thus TRPs, in a network may provide for higher positioning accuracy, but may come with a significant cost because base stations are expensive. A TRP, e.g., the TRP 300, may be a node configured to send PRS (DL-PRS) and receive and measure PRS (UL-PRS). Each TRP may be a base station (e.g., a gNB) or controlled by a base station (e.g., a gNB). A TRP may include an LMF (discussed more fully below), i.e., may have an LMF attached to the TRP (i.e., the node for sending and receiving PRS) in that the LMF may communicate directly with the TRP and/or be co-located with the TRP.

Positioning accuracy may be improved by using UEs as reference points (i.e., anchor UEs) for determining the location of a target UE. For example, positioning accuracy may be improved by using UE-to-UE sidelink positioning signal transmission and/or measurement, UL-PRS reception and measurement by a target UE and/or one or more anchor UEs, and/or DL-PRS transmission by one or more anchor UEs and/or the target UE, thus adding to the number of positioning signal sources and thus the number of reference points for determining a location of the target UE. The increased number of reference points may yield, for example, an increased number of ranges to known locations for use in trilateration, resulting in reduced uncertainty in a determined position estimate.

UEs that are configured to exchange positioning reference signals other than sending UL-PRS or receiving and measuring DL-PRS may be referred to as premium UEs and may include mobile or stationary UEs. For example, a premium UE may be a roadside unit (RSU) (also known as a roadside equipment (RSE)) that is part of a C-V2X infrastructure (e.g., disposed on a roadside structure such as a lamp post, a building surface, etc.) and may transmit and/or receive PRS to/from other UEs. The premium UE may receive and measure SL-PRS (sidelink PRS) from other UEs, and/or may transmit SL-PRS to other UEs that the other UEs may measure, and/or may receive and measure UL-PRS, and/or may transmit DL-PRS.

A premium UE may differ from a base station in one or more of a variety of ways. For example, a premium UE may be configured to communicate with other UEs using one or more sidelink channels (that have different protocols than cell channels), may lack a connection to a wired backhaul, and/or may lack the ability to configure RRC (Radio Resource Control) signaling of other UEs. For example, the premium UE may provide some dynamic information using the sidelink (e.g. scheduling of a sidelink channel or signal like PSSCH (physical sidelink shared channel), or aperiodic sidelink CSI-RS, or aperiodic sidelink SRS for positioning) but may not provide semi-static signaling configuration information to other UEs to schedule or control positioning reference signal transmission (e.g., provide semi-static parameters regarding how and when to transmit SRS for positioning). A base station, for example, may be configured to configure a UE to transmit SRS for positioning periodically, aperiodically, or semi-persistently. For semi-persistent transmissions, the SRS for positioning transmission may be triggered by a base station or a premium UE. Cell channels use NR technology and signals sent over cell channels conform to (i.e., are sent in accordance with) different protocols than signals sent over sidelink channels.

Figure 5:
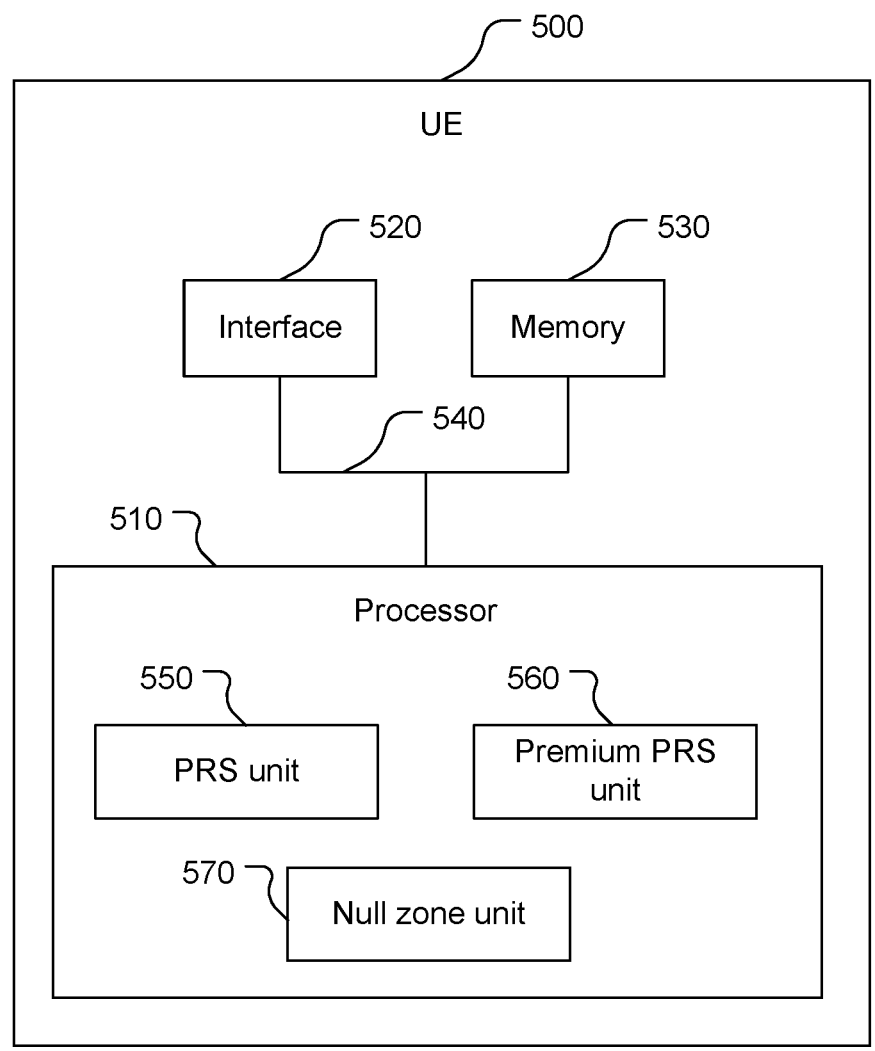
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 200. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function.

The processor 510 (possibly in conjunction with the memory 530 and, as appropriate, the interface 520) may include a PRS unit 550, a premium PRS unit 560, and/or a null zone unit 570. The PRS unit 550 is configured to send UL-PRS via the interface 520 and to receive, via the interface 520, and measure DL-PRS. The premium PRS unit 560 is configured to receive and measure SL-PRS (sidelink PRS) from other UEs, and/or to transmit SL-PRS to other UEs that the other UEs may measure, and/or to receive and measure UL-PRS, and/or to transmit DL-PRS. The null zone unit 570 is configured to determine whether the UE 500 is in a null zone and/or is expected to be in a null zone. Functionality of the premium PRS unit 560 and the null zone unit 570 are discussed further below, and the description may refer to the processor 510 generally, or the UE 500 generally, as performing any of the functions of the premium PRS unit 560 and/or the null zone unit 570.

The premium PRS unit 560 may be configured to measure UL-PRS and/or SL-PRS. For example, the premium PRS unit 560 may be configured to measure SRS for positioning (UL-PRS) sent by another UE, received by the interface 520 (e.g., the antenna 246 and the wireless receiver 244), and received by the processor 510 from the interface 520. The UL-PRS occupy UL resources, being transmitted on an uplink channel (e.g., PUCCH (physical uplink shared channel), or PUCCH (physical uplink control channel)). Also or alternatively, the premium PRS unit 560 may be configured to measure sidelink positioning reference signals (SL-PRS) received from the processor 510, which were received by the interface 520 (e.g., the antenna 246 and the wireless receiver 244). The SL-PRS, while having an SL configuration (i.e., conforming to an SL protocol) and being transmitted on a sidelink channel, may have a format of UL-PRS or DL-PRS or other (reference) signal, e.g., similar or the same sequence, time-frequency pattern within a slot, and/or pattern over slots (e.g., number of resources, resource time gap, resource repetition factor, muting pattern, etc.). As another example, the SL-PRS may be an SL signal repurposed for positioning, such as SL-PSS (SL primary synchronization signal), SL-SSS (SL secondary synchronization signal), SL-CSI-RS (SL channel state information reference signal), SL-PTRS (SL phase tracking reference signal). As another example, the SL-PRS may be a sidelink channel (e.g., PSBCH (physical sidelink broadcast channel), PSSCH (physical sidelink shared channel), PSCCH (physical sidelink control channel), with the corresponding DMRS (Demodulation Reference Signal) included or not) repurposed for positioning. The premium PRS unit 560 may be configured to receive assistance data from a base station and to use the assistance data to measure the received PRS (e.g., SRS for positioning or SL-PRS). The assistance data may include, for example, RSTD (including expected RSTD and RSTD uncertainty) for TDOA-based positioning.

Also or alternatively, the premium PRS unit 560 may be configured to send SL-PRS. The premium PRS unit 560 may be configured to send SL-PRS to another UE via the interface 520 (e.g., the wireless transmitter 242 and the antenna 246), with the SL-PRS having a sidelink configuration (i.e., being sent in accordance with a sidelink protocol) and being sent on a sidelink channel. The premium PRS unit 560 may be configured to produce the SL-PRS with a format of or similar to DL-PRS, or of SRS for positioning (UL-PRS). As another example, the premium PRS unit 560 may be configured to produce the SL-PRS as a sidelink reference signal (SL-RS) such as SL-PSS, SL-SSS, SL-CSI- RS, SL-PTRS repurposed for positioning. As another example, the premium PRS unit 560 may produce the SL-PRS as an SL channel (e.g., PSBCH, PSSCH, PSCCH), repurposed for positioning, with the corresponding DMRS included or not. The premium PRS unit 560 may be configured to produce the SL-PRS with repetition, beam sweeping (through different SL-PRS resources), and/or muting occasions (i.e., zero-power SL-PRS) similar to DL-PRS.

The null zone unit 570 may be configured to determine that the UE 500 has entered a null zone. Thus, the null zone unit 570 may be configured to determine a current presence of the UE 500 in a null zone (i.e., that the UE 500 is presently in a null zone). The null zone unit 570 may determine that the UE 500 is presently in a null zone in response to detecting one or more outlier conditions. For example, the null zone unit 570 may determine that the UE 500 is presently in a null zone in response to detecting an unexpectedly significant change in positioning information (e.g., estimated location, a positioning signal measurement, etc.) output by a Kalman filter, e.g., a change in Kalman filter output exceeding a threshold, e.g., between consecutive outputs or within a threshold amount of time (such that a change rate of the location exceeds a threshold change rate). As another example, the null zone unit 570 may determine that the UE 500 is presently in a null zone in response to detecting a signal-and-interference-to-noise ratio (SINR) that is below an acceptable threshold SINR. As another example, the null zone unit 570 may determine an estimated present location of the UE 500 using one or more techniques independent of, and/or in addition to, presently-received base station PRS (e.g., using dead reckoning, using image capture and comparison to locations corresponding to images, etc.) and determine that the UE 500 is in a null zone based on the estimated present location and a boundary of the null zone. Still other techniques, and/or a combination of two or more techniques, may be used by the null zone unit 570 to determine that the UE 500 is presently in a null zone.

The null zone unit 570 may be configured to determine that the UE 500 is expected to enter a null zone. For example, the null zone unit 570 may analyze information regarding a future location of the UE 500 and a boundary of a null zone to determine whether the UE 500 will be (or will likely be) in the null zone in the future. The information regarding the future location may be calculated by the null zone unit 570. For example, the null zone unit may calculate an expected future location of the UE 500, and corresponding time, based on a present and/or prior estimated location of the UE 500 and motion information regarding the UE 500 such as a present velocity or a present trajectory. As another example, the null zone unit 570 may use a provided location of the UE 500, e.g., a location entered into a calendar of a user of the UE 500, and a boundary of the null zone to determine whether the UE 500 will be in the null zone in the future.

The null zone unit 570 may be configured to report current and/or future presence of the UE 500 in a null zone to one or more other entities, such as one or more network entities (e.g., a TRP, a server) and/or one or more other UEs. The report of the presence in a null zone may be explicit, or may be implicit (e.g., a request for UE-UE PRS exchange). The null zone unit 570 may be configured to report the presence in the null zone in real time (e.g., as soon as possible after a null zone presence determination) and/or at a later time, e.g., when a communication link is established if there is no communication link between the UE 500 and a TRP 300 when the presence in the null zone is determined.

The null zone unit 570 may be configured to determine a null zone and/or to assist another entity, e.g., the server 400, determine a null zone by crowdsourcing location information. The null zone unit 570 may, for example, determine positioning-quality pairs each containing an estimated location of the UE 500 and a corresponding location uncertainty. The null zone unit 570 may record and analyze the positioning-quality pairs and determine boundaries of null zones corresponding to regions of location uncertainty above a threshold acceptable location uncertainty. Also or alternatively, the processor 510 may report the positioning-quality pairs to another entity such as the TRP 300 and/or the server 400, and TRP 300 and/or the server 400 (e.g., a UE-UE PRS unit 360 and/or a UE-UE PRS unit 460) may analyze the positioning-quality pairs received from the UE 500 and/or one or more other UEs to determine boundaries of null zones. The reported positioning-quality pairs may be used, for example, by the TRP 300 and/or the server 400 to determine whether the UE 500 would be a candidate to be an anchor UE. Also or alternatively, the null zone unit 570 may record and/or report estimated locations of the UE 500 (e.g., based on dead reckoning, etc.) corresponding to an unexpectedly large change in positioning information. The null zone unit 570 and/or another entity may use these locations to determine null zone boundaries. Collecting multiple samples for similar locations over time may help the null zone unit 570 and/or another entity determine null zone boundaries despite some false positive and/or false negative data points. Similar to determining null zone boundaries, hot zones (where sufficient base station PRS are present for determining position with acceptable accuracy) may be determined.

Referring again to FIGS. 3 and 4, the processor 310 (possibly in conjunction with the memory 311 and, as appropriate, the transceiver 315 (or one or more portions thereof)) may include the UE-UE PRS unit 360 and/or the processor 410 (possibly in conjunction with the memory 411 and, as appropriate, the transceiver 415 (or one or more portions thereof)) may include the UE-UE PRS unit 460. The UE-UE PRS unit 360 may include a location management function (LMF). Either or both of the UE-UE PRS units 360, 460 may be configured to determine a presence of the UE 500 in a null zone using one or more techniques discussed herein with respect to the null zone unit 570. Either or both of the UE-UE PRS units 360, 460 may be configured to obtain (e.g., produce, retrieve from memory, etc.) and send one or more PRS configurations for one or more corresponding anchor UEs to facilitate PRS exchange between the target UE and one or more anchor UEs. Functionality of the UE-UE PRS units 360, 460 are discussed further below, and the description may refer to the processor 310, 410 generally, or the TRP 300 generally, or the server 400 generally, as performing any of the functions of the UE-UE PRS units 360, 460, respectively.

Figure 6A:
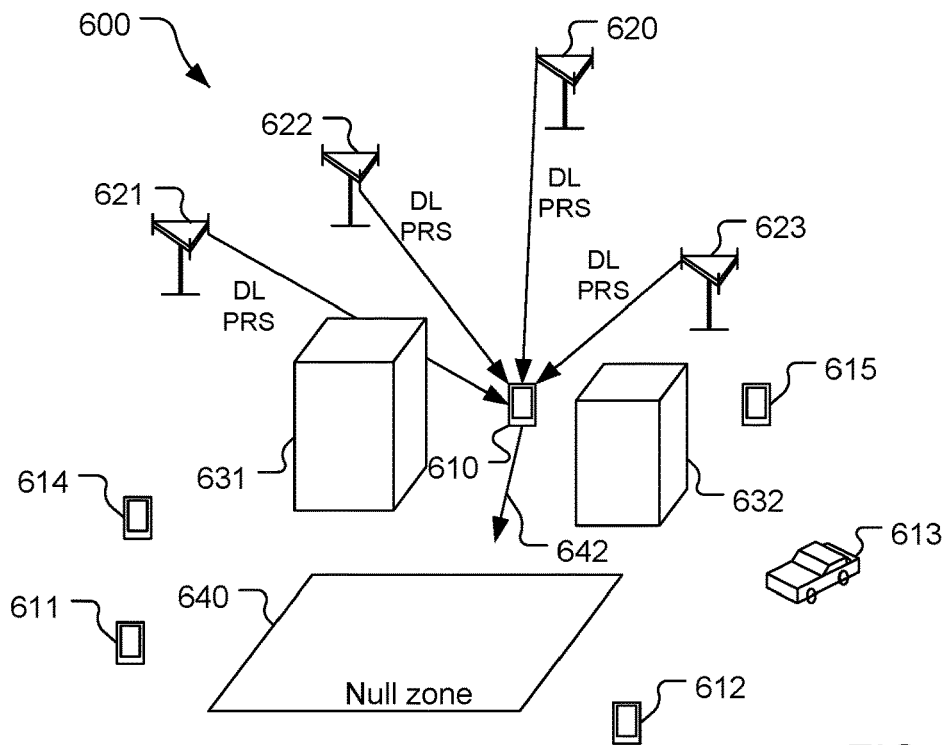
FIG. 6A is a simplified diagram of an outdoor environment with a UE moving toward a null zone.
Figure 6B:
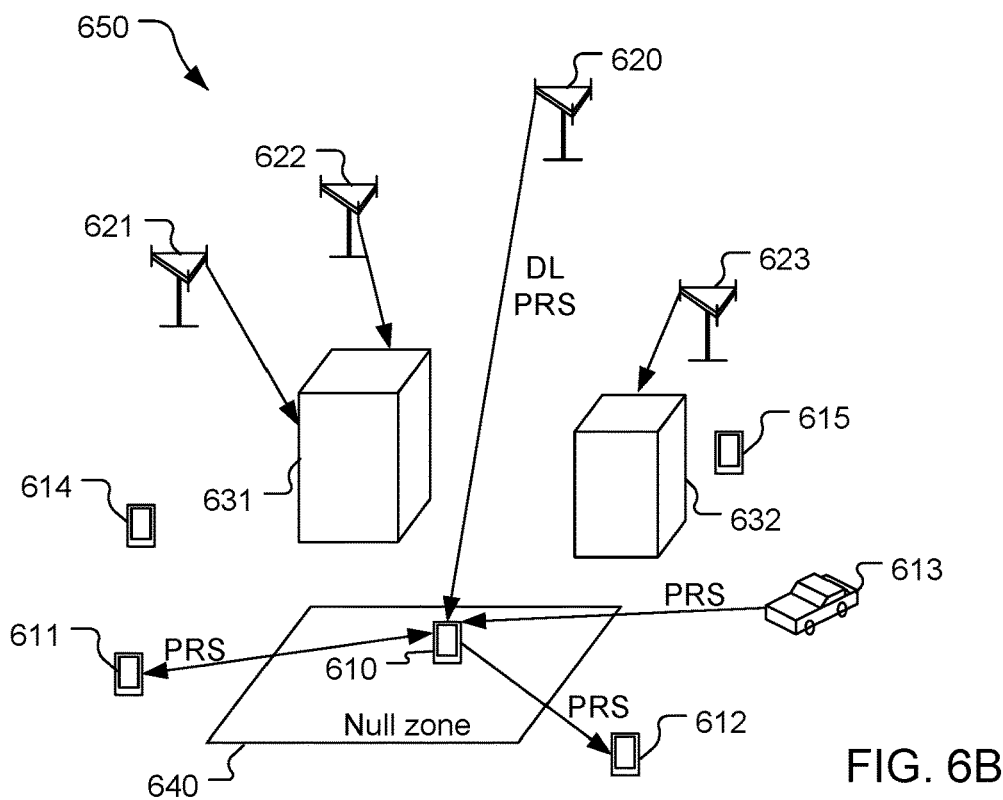
FIG. 6B is a simplified diagram of the outdoor environment shown in FIG. 6A with the UE disposed in the null zone.

Referring to FIG. 6A and FIG. 6B, environments 600, 650 include multiple UEs 610, 611, 612, 613, 614, 615, multiple base stations 620, 621, 622, 623, objects 631, 632 (here buildings), and a null zone 640. In the environment 600, the UE 610 is outside of the null zone 640 and is moving toward the null zone 640 such that the UE 610 is expected to move into the null zone 640 based on a present velocity vector 642. In the environment 600, the UE 610 has LOS with all four of the base stations 620-623. In the environment 650, the UE 610 has moved into the null zone 640, and now has LOS with the base station 620 and not the base stations 621-623 of the base stations 620-623, but is now exchanging PRS with the UEs 611-613 to facilitate determination of the position of the UE 610, e.g., enabling position determination and/or improving position accuracy compared to not exchanging PRS with the UEs 611-613. The environments 600, 650 are examples provided to help illustrate techniques discussed herein and not limiting of the disclosure.

Figure 7:
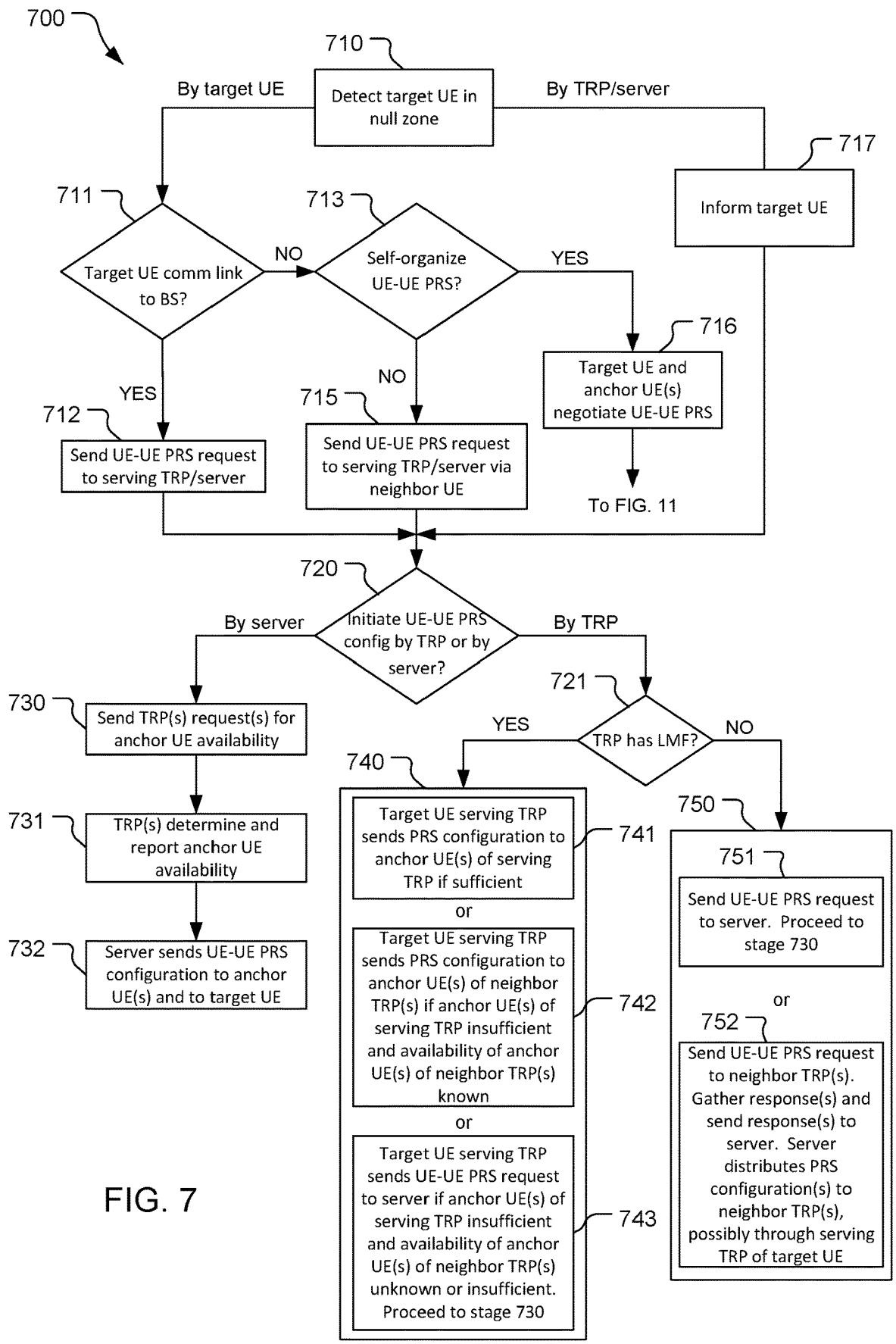
FIG. 7 is a block diagram of an example flow of operations and operational contingencies.
Figure 8:
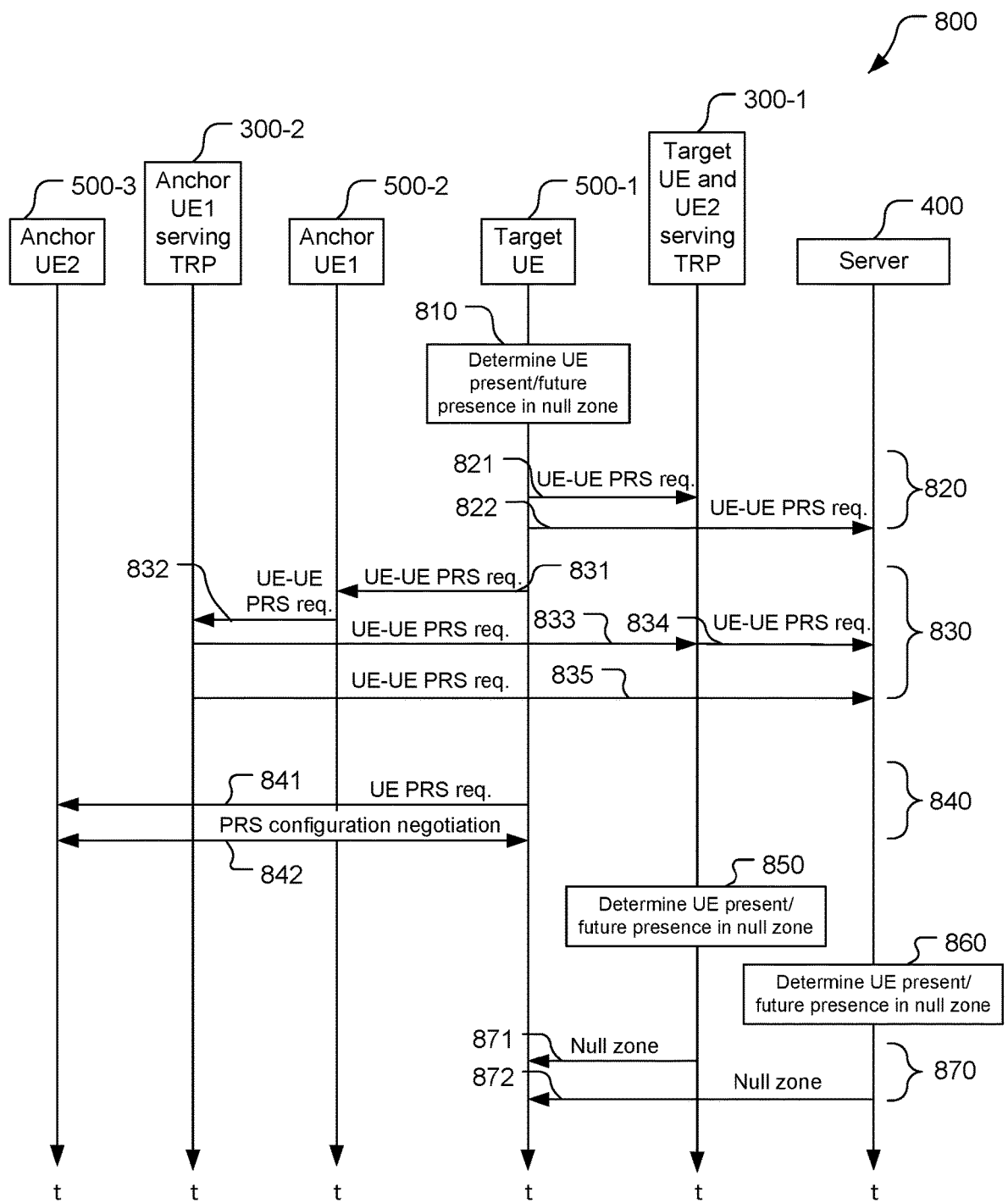
FIG. 8 is a signaling and process flow for requesting UE-UE PRS exchange.
Figure 9:
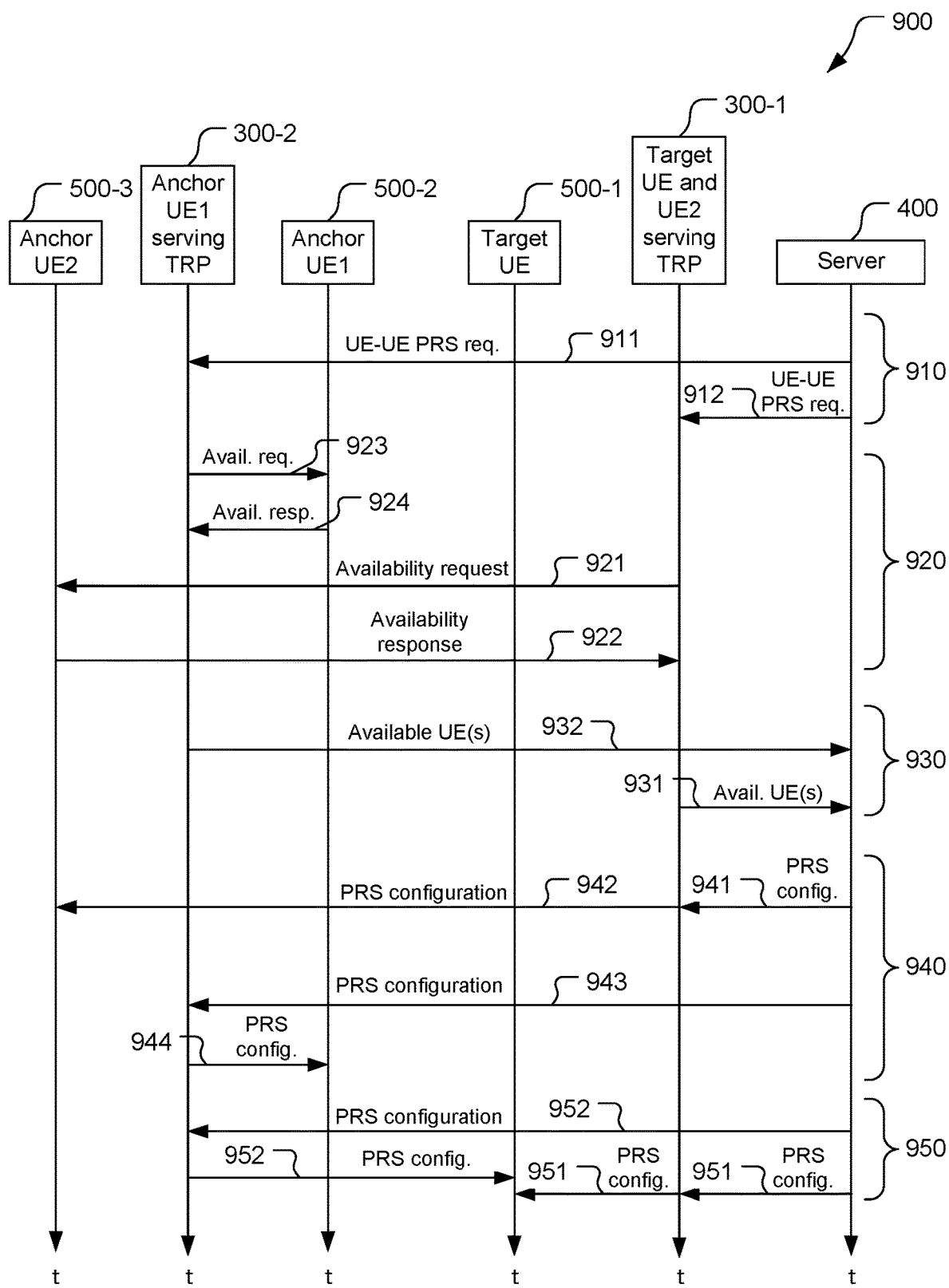
FIG. 9 is a signaling and process flow for server-initiated obtaining of PRS configuration for UE-UE PRS exchange.
Figure 10:
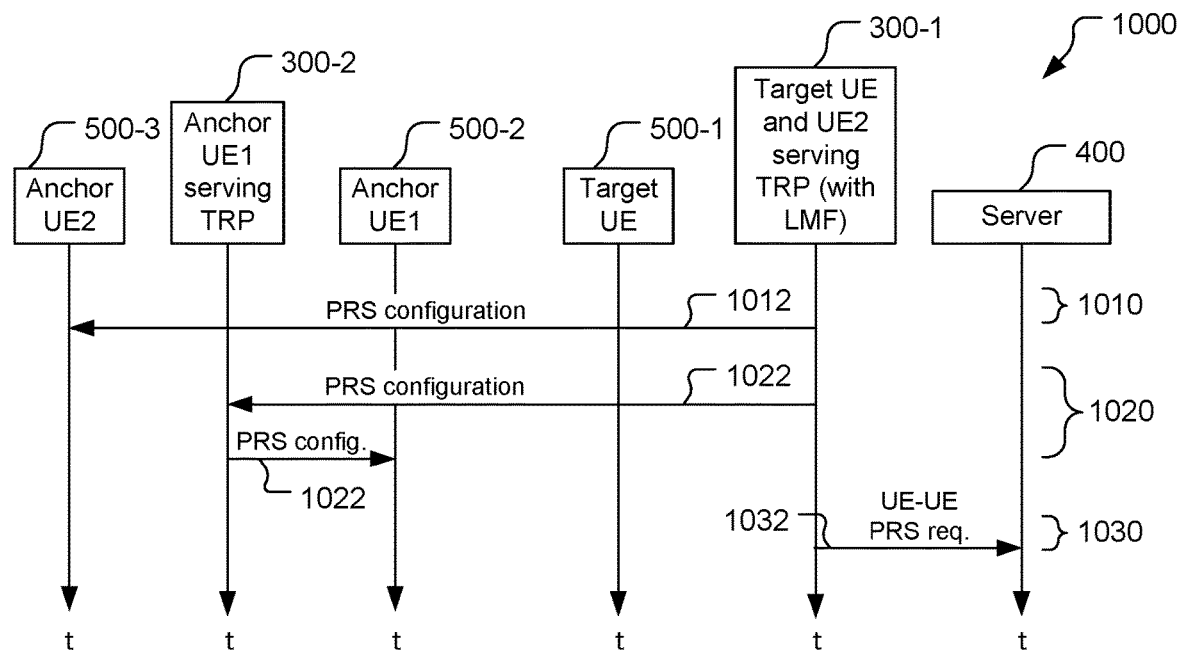
FIG. 10 is a signaling and process flow for TRP-initiated obtaining of PRS configuration for UE-UE PRS exchange.
Figure 11:
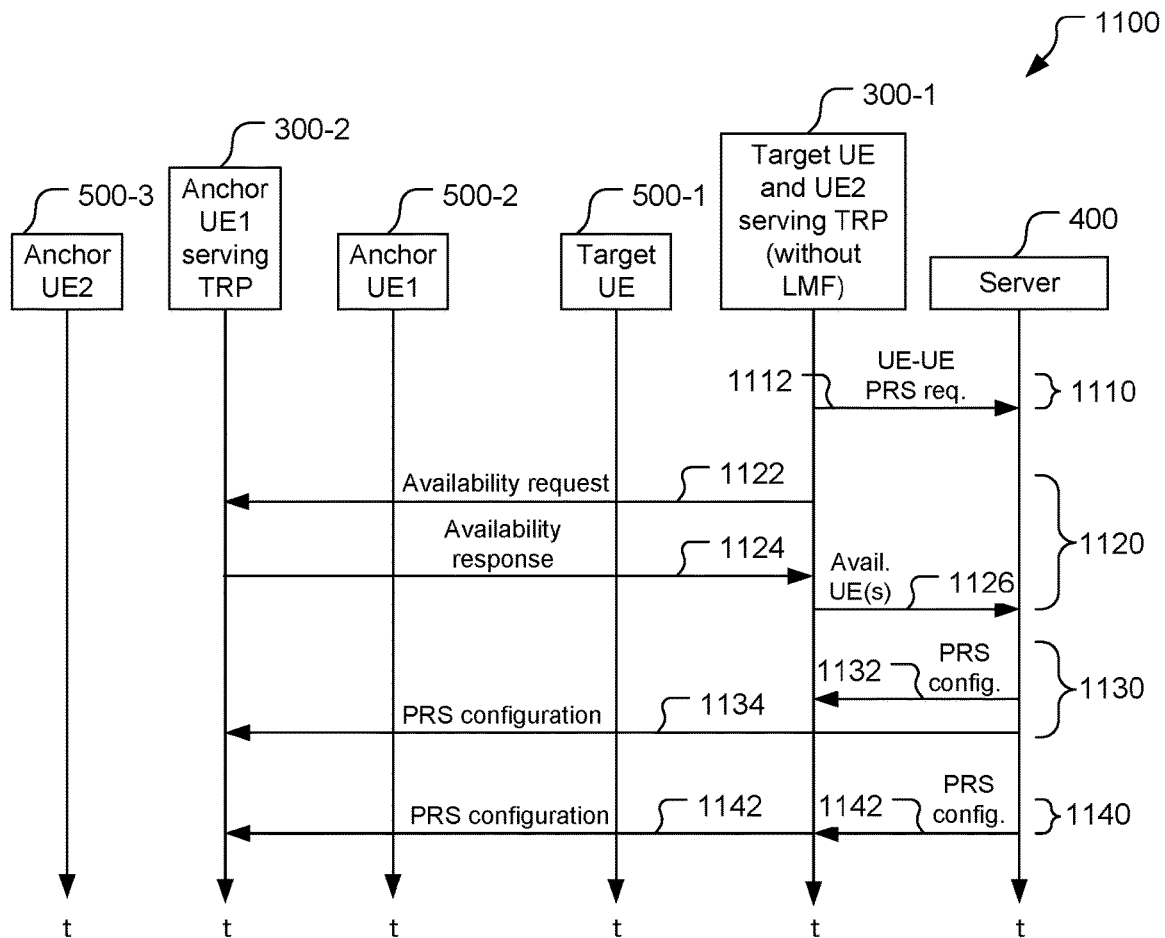
FIG. 11 is another signaling and process flow for TRP-initiated obtaining of PRS configuration for UE-UE PRS exchange.

Referring to FIG. 7, with further reference to FIGS. 1-6 and 8-10, a flow 700 includes blocks indicating operations and operational contingencies for configuring UEs with PRS configurations for UE-UE PRS exchange, i.e., exchange of one or more PRS signals between two separate UEs. The operational contingency blocks may represent contingencies based on conditions (e.g., structural configuration conditions) and not necessarily decisions that are made. FIGS. 8-11 include signal and processing flows 800, 900, 1000, 1100 for determining presence of a UE in a null zone, initiating UE-UE PRS exchange by the server 400 (e.g., an LMF), and initiating UE-UE PRS exchange by a TRP 300, respectively. In FIGS. 8-11, a target UE 500-1 and anchor UEs 500-2, 500-3 are each an example of the UE 500, with the premium PRS unit 560 and/or the null zone unit 570 being optional in each of the UEs 500-1, 500-2, 500-3. The target UE 500-1 is the UE for which the position is desired, and that may enter the null zone 640, e.g., the UE 610 in FIGS. 6A, 6B. A TRP 300-1 is a serving TRP of the target UE 500-1, and a TRP 300-2 is a serving TRP of the anchor UE 500-2. The TRP 300-1, as discussed below, may include an LMF. The discussion of FIGS. 7-11 references FIGS. 6A and 6B to facilitate understanding, but the discussion has applicability beyond FIGS. 6A and 6B.

At block 710, the presence of the target UE 500-1 in a null zone is detected to initiate UE-UE PRS exchange. The presence may be a current presence or future presence in the null zone 640. The presence may be detected, and thus the UE-UE PRS exchange initiated, by the UE 500-1 at stage 810 and/or the TRP 300 at stage 850 and/or the server 400 at stage 860, e.g., by the null zone unit 570 and/or the UE-UE PRS unit 360 and/or the UE-UE PRS unit 460. If the presence in the null zone is detected by the target UE 500-1, then the flow 700 proceeds to block 711, and if the null zone is detected by the TRP 300 or server 400, then the flow 700 proceeds to block 717 (discussed below after the discussion of block 716).

At block 711, the target UE 500-1 determines whether the target UE 500-1 has an acceptable communication link with the serving TRP 300-1. For example, the processor 510 of the target UE 500-1 may determine whether a signal quality (e.g., SNR, SINR) of one or more communications or communication channels is above a respective desired threshold. If the target UE 500-1 determines that the target UE 500-1 has an acceptable communication link with the serving TRP 300-1, then the flow 700 proceeds to block 712, and proceeds to block 713 if the target UE 500-1 determines that the target UE 500-1 has an unacceptable communication link with the serving TRP 300-1.

At block 712, the target UE 500-1 sends a UE-UE PRS request to the serving TRP 300-1 (for the target UE 500-1) and/or to the server 400. For example, at stage 820 the target UE 500-1 may send a UE-UE PRS request message 821 to the TRP 300-1 serving the target UE 500-1 and/or a UE-UE PRS request message 822 to the server 400. The UE-UE PRS request message 821 may be sent to the serving TRP 300-1 through the Uu interface, e.g., as part of UCI (Uplink Control Information) or as part of a MAC-CE (Media Access Control-Control Element). The UE-UE PRS request message(s) 821, 822 may explicitly request to have PRS signal exchange with at least one other UE or may implicitly request to have PRS signal exchange with at least one other UE, e.g., by indicating the detected presence of the target UE 500-1 in the null zone 640. The UE-UE PRS request message(s) 821, 822 may suggest one or more anchor UEs, e.g., UEs that are in communication range of the target UE 500-1 and that have low position uncertainty. The PRS signal exchange may be SL-PRS over a sidelink channel, UL-PRS over a UL channel, and/or DL-PRS over a DL channel. The flow 700 proceeds to block 720 to initiate UE-UE PRS configuration assignment.

At block 713, with an unacceptable (e.g., absent) communication link with the serving TRP 300-1, the target UE 500-1 may determine whether the target UE 500-1 will self-organize UE-UE PRS exchange. For example, if the target UE 500-1 is operating in SL mode 1 (where the target UE 500-1 is assisted by a base station, e.g., an eNB, and uses dedicated radio resources for data transmission), then the network handles scheduling, but if the target UE 500-1 is operating in SL mode 2 (where the target UE 500-1 (randomly) selects the radio resources from a resource pool sent by the base station), then the target UE 500-1 may choose to self-organize UE-UE PRS exchange. If the target UE 500-1 determines not to self-organize UE-UE PRS exchange, then the flow 700 proceeds to block 715, and proceeds to block 716 if the target UE 500-1 determines to self-organize UE-UE PRS exchange. There may not be a decision at block 713, e.g., if the target UE 500-1 is not configured to self-organize UE-UE exchange.

At block 715, the target UE 500-1 sends a UE-UE PRS request to the serving TRP 300-1 and/or to the server 400 via a neighbor UE. For example, the target UE 500-1 sends the UE-UE PRS request to a UE within communication range (e.g., sidelink communication range) of the target UE 500-1. For example, at stage 830 the target UE 500-1 may send a UE-UE PRS request 831 to the anchor UE 500-2. This is an example for sake of simplicity and consistency of FIGS. 8-10, and the target UE 500-1 may send the request to any neighbor UE (i.e., any UE within communication range) regardless of whether that UE eventually becomes an anchor UE. The UE-UE PRS request message may suggest one or more anchor UEs, e.g., UEs that are in communication range of the target UE 500-1 and that have low position uncertainty. The anchor UE 500-2 sends a corresponding UE-UE PRS request 832, indicating that the request is on behalf of the target UE 500-1, through the Uu interface (e.g., as part of UCI or MAC-CE) to the TRP 300-2 that is the serving TRP of the anchor UE 500-2. The TRP 300-2 sends a corresponding UE-UE PRS request 833, indicating that the request is on behalf of the target UE 500-1, to the TRP 300-1 and/or a corresponding UE-UE PRS request 835 to the server 400. The TRP 300-1 may send a corresponding UE-UE PRS request 834 (responsive to receiving the request 833), indicating that the request is on behalf of the target UE 500-1, to the server 400. The flow 700 proceeds to block 720 to initiate UE-UE PRS configuration.

At block 716, with the target UE 500-1 self-organizing the UE-UE PRS, the target UE 500-1 communicates with one or more UEs to determine whether the UE(s) are available to be anchor UE(s) and if so, then to negotiate UE-UE PRS with the anchor UE(s). For example, at stage 840, the target UE 500-1 may send a UE-UE PRS request 841 to the anchor UE 500-3 to request whether the UE 500-3 is available for UE-UE PRS exchange. The anchor UE 500-3 is available for the UE-UE PRS exchange if the anchor UE 500-3 is configured to exchange PRS with the target UE 500-1 as desired by the target UE 500-1 and has available resources for such exchange. The desired PRS exchange may depend on the positioning technique to be implemented (e.g., by the target UE 500-1 or the server 400) to determine the location of the target UE 500-1. The desired PRS exchange may be for SL-PRS to and/or from the target UE 500-1, DL-PRS to and/or from the target UE 500-1, and/or UL-PRS to and/or from the target UE 500-1. If the UE 500-3 is available for UE-UE PRS exchange, then the target UE 500-1 and the anchor UE 500-3 may engage in PRS configuration negotiation 842 at stage 840 to determine the PRS configuration, e.g., the PRS parameters that will be used by each of the UEs 500-1, 500-3, for the UE-UE PRS exchange. With the PRS configuration determined, PRS exchange may begin as discussed with respect to FIG. 11.

At block 717, with the presence of the target UE 500-1 in the null zone 640 detected by the TRP and/or the server 400, the target UE 500-1 is informed of the null zone presence. For example, having determined the null zone presence at stage 850 and/or stage 860, respectively, the TRP 300-1 and/or the server 400 may send a respective null zone message 871, 872 at stage 870 to the target UE 500-1. The null zone message 871, 872 indicates to the target UE 500-1 that the target UE 500-1 will be involved in UE-UE PRS exchange. The null zone message(s) 871, 872 may not be sent to the target UE 500-1, e.g., if the PRS configuration implemented will be transparent to the target UE 500-1, e.g., if unicast DL-PRS (from a TRP) that would be measured by the UE 500-1, but that cannot reach the target UE 500-1, is replaced by DL-PRS from an anchor UE (e.g., with identical PRS configuration parameters). The flow 700 proceeds to block 720 to initiate UE-UE PRS configuration.

At block 720, determining and sending the UE-UE PRS configuration may be initiated by the TRP 300-1 or the server 400. If the detected null zone presence of the target UE 500-1 is a future presence, then the determining of the UE-UE PRS configuration may be proactive, before the target UE 500-1 enters the null zone 640. Thus, anchor UEs may be proactively searched for and configured (reconfigured) for UE-UE PRS exchange with the target UE 500-1. This may help maintain positioning of the target UE 500-1 as the target UE 500-1 moves from outside the null zone 640 to inside the null zone 640. If the UE-UE PRS configuration assignment is initiated by the TRP 300-1, then the flow 700 proceeds to block 721 and if the UE-UE PRS configuration assignment is initiated by the server 400, then the flow 700 proceeds to block 730. At block 721, if the TRP 300-1 has an LMF (LMF in the RAN), then the flow 700 proceeds to block 740 and if the TRP 300-1 does not have an LMF, then the flow 700 proceeds to block 750.

At block 730, the server 400 may send one or more TRPs 300 one or more corresponding requests for anchor UE availability, i.e., availability of one or more UEs to be anchor UEs. For example, at stage 910, the server 400 (e.g., the UE-UE PRS unit 460) may send a respective UE-UE PRS request 911, 912 (in accordance with LPPa) to the TRPs 300-1, 300-2. The server 400 may know locations of UEs served by the TRPs 300-1, 300-2 and one or more of the requests 911, 912 sent to the TRPs 300-1, 300-2 may request the availability of one or more UEs that the server 400 determines to be good candidates for being anchor UEs, e.g., one or more neighbor UEs (of the target UE 500-1) that are (or will be) close to (within a threshold distance of) the target UE 500-1 and/or that are (or will be) close to (within a threshold distance of), but outside of, the null zone 640 (e.g., in a hot zone) and/or that have low location uncertainties. For example, the server 400 may identify the UEs 611, 612, 613 as good candidates for being anchor UEs and identify the UEs 614, 615 as not being good candidates for being anchor UEs (or at least not identify the UEs 614, 615 as being good candidates for being anchor UEs). One or more of the requests 911, 912 may request UE availability without identifying any specific UEs.

At block 731, one or more TRPs 300 that receive a request at block 730 determine and report anchor UE availability. For example, the TRPs 300-1, 300-2 may determine whether UEs have available resources having desired PRS parameters, e.g., desired frequency layers, point-As, etc. One or more of the TRPs 300-1, 300-2 may communicate with the UEs to determine availability. For example, at stage 920, the TRPs 300-1, 300-2 send respective availability requests 921, 923 to UEs, in this example, the UEs 500-3, 500-2. The TRPs 300-1, 300-2 may send availability requests (e.g., as part of DCI (Downlink Control Information) and/or MAC-CE according to RRC) to more than one UE. The availability requests may request information regarding, for example, available power at the UE, willingness of the UE to be an anchor UE (e.g., lack of higher priorities preventing or inhibiting serving as an anchor UE), etc. Stage 920, however, may be omitted, e.g., if the TRP 300 or the server 400 will not factor in responses by the UEs for determining anchor UEs. For example, while in a commercial setting (e.g., with UEs being smartphones of private users), forcing UEs to be anchor UEs may not be desirable, in some settings (e.g., a factory with UEs being robots) the server 400 may force UEs to be anchor UEs, e.g., if the UEs meet one or more PRS parameter criteria regardless of other factors. Any of the UEs, e.g., the UEs 500-3, 500-2, that receive an availability request may send an availability response, e.g., availability responses 922, 924, to a respective TRP, e.g., the respective TRPs 300-1, 300-2. The TRPs 300-1, 300-2 may determine whether UEs are available to serve as anchor UEs. At stage 930, the TRPs 300-1, 300-2 may send availability messages 931, 932 to the server 400 indicating any UEs that are available to serve as anchor UEs and/or indicating values of parameters (e.g., PRS parameters, power level, etc.) that the server 400 may use to determine which UEs are available to serve as anchor UEs.

At block 732, the server 400 collects and analyzes the information regarding anchor UE availability and sends UE-UE PRS configuration(s) to the anchor UE(s) and to the target UE 500-1. The server 400, e.g., the UE-UE PRS unit 460 determines the PRS configuration for each UE to serve as an anchor UE and sends the respective PRS configuration to the appropriate TRP(s) 300 for forwarding to the anchor UE(s) to cause the anchor UE(s) to reserve the appropriate resources, e.g., SL resources. For example, at stage 940, the server 400 may send a UE-UE PRS configuration 941 for the anchor UE 500-3 to the TRP 300-1, and the TRP 300-1 may send a UE-UE PRS configuration 942 (e.g., forward the UE-UE PRS configuration 941) to the anchor UE 500-3. Also at stage 940, the server 400 may send a UE-UE PRS configuration 943 for the anchor UE 500-2 to the TRP 300-2 (either directly or via the TRP 300-1), and the TRP 300-2 may send a UE-UE PRS configuration 944 (e.g., forward the UE-UE PRS configuration 943) to the anchor UE 500-2. At stage 950, the server 400 may send the UE-UE PRS configuration(s) for the anchor UE(s) to the target UE 500-1 to facilitate the target UE 500-1 measuring PRS from the anchor UE(s) and/or to transmit PRS appropriately to facilitate the anchor UE(s) measuring PRS from the target UE 500-1. The server 400 may send a PRS configuration(s) 951 to the target UE 500-1 via the serving TRP 300-1 of the target UE 500-1. Also or alternatively, the server 400 may send a PRS configuration(s) 952 to the target UE 500-1 via another TRP, here the TRP 300-2, e.g., if the target UE 500-1 has a poor or non-existent communication link with the TPR

300-1. The PRS configuration may be periodic, semi-persistent, or aperiodic (P/SP/A). The PRS configuration may indicate to use SL, DL, and/or UL channels. The PRS configuration for SL-PRS may have the same format as DL-PRS or UL-PRS.

The PRS configuration (i.e., the UE-UE PRS configuration) may result in PRS that is transparent to the target UE 500-1. For example, the PRS configuration may be sent unicast to each appropriate anchor UE and may assign each anchor UE to fill a PRS resource that would be filled by a unicast PRS resource sent from a TRP to the target UE 500-1, e.g., in a default PRS configuration that includes unicast PRS from TRP(s) to the target UE 500-1. For example, if unicast PRS signals from M TRPs are blocked from reaching the target UE 500-1 in a comb-N PRS configuration (where N>M), then the server 400 may assign M anchor UEs to transmit the identical (at least from the target UE perspective) PRS signals sent by the M TRPs. The anchor UE PRS thus replace the blocked TRP PRS. This procedure is transparent to the target UE 500-1 as the mapping between the blocked TRPs and the anchor UEs is known to the server 400.

At block 740, with the serving TRP 300-1 having an LMF (location management function), e.g., in the UE-UE PRS unit 360, the serving TRP 300-1 may initiate PRS configuration assignment in a variety of ways. Having an LMF in the TRP may help reduce positioning latencies by having the LMF closer to the UEs. For example, the latency for determining a UE position may be reduced from about 1 second, with the TRP not having an LMF, to about 0.1 seconds or even about 0.01 seconds with the TRP having an LMF, although these times are examples and not limiting of the techniques discussed herein. The TRP 300-1 may be able to assign PRS configuration or may request the server 400 to assign the PRS configuration.

At block 741, the TRP 300-1 assigns UE-UE PRS configuration to one or more anchor UEs that are served by the TRP 300-1. For example, the TRP 300-1 may have knowledge of the availability of UEs served by the TRP 300-1. The TRP 300-1, e.g., the UE-UE PRS unit 360 may determine the availability of one or more UE(s) served by the TRP 300-1. The TRP 300-1 may, at stage 1010, send a PRS configuration 1012 to the available anchor UE(s) served by the TRP 300-1, in this example, the anchor UE 500-3. The TRP 300-1 may be configured to assign the PRS configuration(s) to the anchor UE(s) served by the TRP 300-1 in response to determining that the anchor UE(s) served by the TRP 300-1 will, in combination with any TRPs that are not blocked in the null zone 640, result in one or more positioning criteria, e.g., position uncertainty, being met.

At block 742, the TRP 300-1 may also or alternatively send UE-UE PRS configuration to one or more neighbor TRPs (neighboring the TRP 300-1). For example, if the anchor UE(s) served by the TRP 300-1 are insufficient to result in the one or more positioning criteria being met, the TRP 300-1 may use knowledge of the availability of one or more anchor UEs served by one or more neighboring TRPs to assign UE-UE PRS configuration to the anchor UE(s) of the neighbor TPR(s). The TRP 300-1 may obtain knowledge of the availability of the UE(s) served by the neighbor TRP(s) by syncing with the neighbor TRP(s), e.g., similar to blocks 731 and 732. Thus, for example, the TRP 300-1 may send, at stage 1020, a PRS configuration 1022 for one or more UE(s) served by one or more neighbor TRP(s) to the anchor UE(s) via the neighbor TRP(s), in this example, to the anchor UE 500-2 via the TRP 300-2 (i.e., send the PRS configuration 1022 to the TRP 300-2 over the Xn interface for forwarding to the anchor UE 500-2). The TRP 300-1 may send the PRS configuration 1022 at stage 1020 in addition to, or instead of, the PRS configuration sent at stage 1010.

At block 743, the TRP serving the target UE may also or alternatively send a UE-UE PRS request to the server in response to the anchor UE(s) served by the TRP serving the target UE being insufficient to result in meeting of the one or more positioning criteria, and the availability of UE(s) of neighbor TRP(s) is either unknown or would still not result in meeting the one or more positioning criteria. For example, at stage 1030, the TRP 300-1 may send a UE-UE PRS request 1032 to the server 400. The request 1032 sent at stage 1030 may be similar to the UE-UE PRS request 822 sent at stage 820 by the target UE 500-1 to the server 400. The request 1032 sent at stage 1030 may trigger PRS configuration assignment by the server 400, with the flow 700 proceeding to block 730.

At block 750, with the serving TRP 300-1 lacking or not using an LMF, the serving TRP 300-1 may initiate PRS configuration assignment in one or more of a variety of ways. For example, the TRP 300-1 may request the server 400 to assign PRS configuration(s) or the TRP 300-1 may coordinate information gathering and PRS configuration assignment.

At block 751, the TRP 300-1 may request the server 400 to determine and assign PRS configuration(s). For example, at stage 1110, in response to receiving the UE-UE PRS request at stage 820 (e.g., through the Uu interface as part of UCI/MAC-CE in accordance with RRC) from the target UE 500-1, the TRP 300-1 may send a UE-UE PRS request 1112 to the server 400 via LPPa. The flow 700 may then proceed to block 730.

At block 752, the TRP 300-1 may coordinate PRS configuration determination and assignment. For example, at stage 1120, the TRP 300-1 may send an availability request 1122 to the TRP 300-2 (and/or to one or more other TRPs) for availability information regarding potential anchor UEs. The TRP 300-2, and any other TRPs to which requests were sent, may send an availability response 1124 to the TRP 300-1 indicating any available anchor UEs and/or data from which anchor UEs may be identified. The TRP 300-1 gathers this anchor UE availability information and provides the anchor UE availability information to the server 400 in an available UE(s) message 1126. The server 400 may select one or more anchor UE(s), if any, based on the UE availability information and possibly other information such as location(s) of the possible anchor UE(s) relative to the target UE 500-1 and/or relative to the null zone 640. At stage 1130, the server 400 may send PRS configuration(s) 1132, 1134 to the respective TRPs, in this example, the TRPs 300-1, 300-2. Alternatively, at stage 1140, the server 400 may send PRS configuration(s) 1142 to one TRP, e.g., the TRP that provided the anchor UE availability information, here the TRP 300-1, and that TRP may send the PRS configuration(s) 1142 to the other appropriate TRP(s).

The server 400 or the TRP, e.g., the TRP 300-1, may (e.g., periodically) assign a default UE-UE PRS configuration (e.g., SL-PRS) to a candidate anchor UE. The candidate anchor UE may remain silent until approached by the target UE 500-1 and may use the default configuration (e.g., default PRS parameters such as slot offset, point-A, frequency layer, etc.) to negotiate UE-UE PRS exchange with the target UE 500-1, e.g., at stage 840. The TRP may reserve certain resources (e.g., a resource pool of certain SL-PRS resources) for mode 2 SL (self-organized with gNB scheduling) UE-UE positioning and the anchor UE(s) and the target UE 500-1 may use the reserved resources for the UE-UE PRS exchange, e.g., instead of negotiating the UE-UE PRS exchange.

Figure 12:
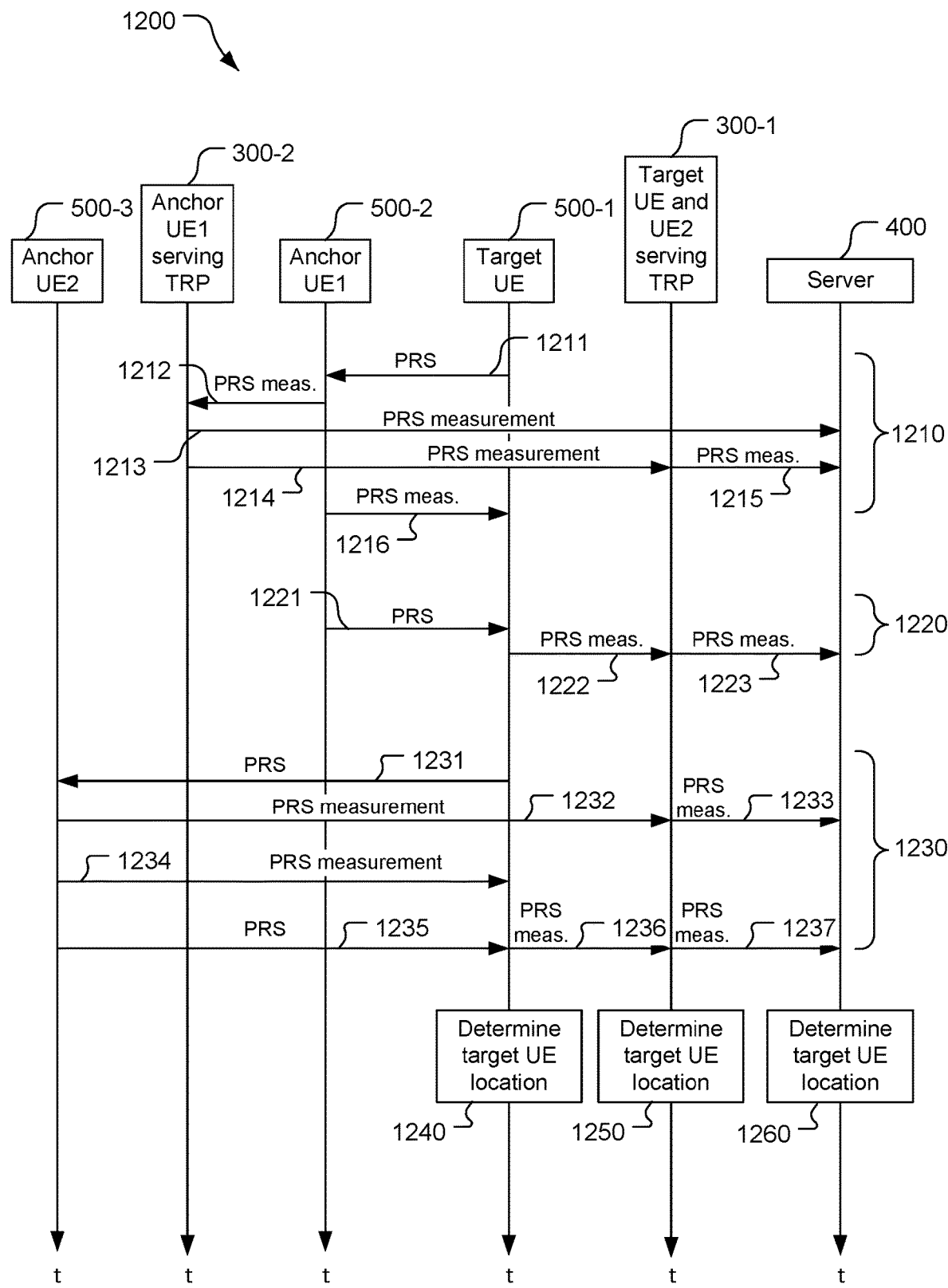
FIG. 12 is a signaling and process flow of UE-UE PRS exchange and UE location determination.

Referring to FIG. 12, with further reference to FIGS. 1-11, a signaling and process flow 1200 for UE-UE PRS exchange and location determination includes the stages shown. The UE-UE PRS exchange includes sending and receiving/measuring one or more PRS. The flow 1200 is an example and not limiting of the disclosure, as stages may be added, rearranged, and/or removed.

At stage 1210, a PRS from the target UE 500-1 is measured and reported. The target UE 500-1 may send a PRS in a PRS message 1211 to the anchor UE 500-2, and the anchor UE 500-2 may measure the PRS and report the measurement to the TRP 300-2, that serves the anchor UE 500-2, in a PRS measurement message 1212. The PRS in the PRS message 1211 may be sent over a sidelink channel, an uplink channel, or a downlink channel depending on the capabilities of the target UE 500-1 and the anchor UE 500-2, which are taken into account in the selection of the anchor UE 500-2 and the determination and assignment of the PRS configuration to the anchor UE 500-2 and the target UE 500-1. A sidelink channel PRS may have a format of UL-PRS or DL-PRS or another format. The anchor UE 500-2 may send the PRS measurement in a PRS measurement message 1213 to the server 400. The anchor UE 500-2 may open a PRS session with the server 400 for measurement relay. The anchor UE 500-2 may send the PRS measurement in a PRS measurement message 1214 to the TRP 300-1, serving the target UE 500-2, that sends the PRS measurement in a PRS measurement message 1215 to the server 400. The anchor UE 500-2 may also or alternatively send the PRS measurement to the target UE 500-1 in a PRS measurement message 1216.

At stage 1220, a PRS from the anchor UE 500-2 is measured and reported. The anchor UE 500-2 may send a PRS in a PRS message 1221 to the target UE 500-1, and the target UE 500-1 may measure the PRS and report the measurement to the TRP 300-1, that serves the target UE 500-1, in a PRS measurement message 1222, and/or may report the measurement to another TRP, e.g., depending on link quality (e.g., if the communication link to the TRP 300-1 is poor or non-existent). The PRS in the PRS message 1221 may be sent over a sidelink channel, an uplink channel, or a downlink channel. The TRP 300-1 may send the PRS measurement to the server 400 in a PRS message 1223.

At stage 1230, PRS may be exchanged, measured, and reported similar to stages 1210 and 1220. At stage 1230, PRS 1231 may be sent from the target UE 500-1 to the anchor UE 500-3, that has the same serving TRP as the target UE 500-1, and/or PRS 1235 may be sent from the anchor UE 500-3 to the target UE 500-1. The PRS 1231 may be measured by the anchor UE 500-3 and a PRS measurement 1232 reported by the anchor UE 500-3 to the TRP 300-1, which may transmit a PRS measurement 1233 to the server 400. Also or alternatively, the anchor UE 500-3 may transmit a PRS measurement 1234 of the PRS 1231 to the target UE 500-1. The Target UE 500-1 may measure the PRS 1235 and transmit a PRS measurement 1236 corresponding to the PRS 1235 to the TRP 300-1, which may transmit a PRS measurement 1237, corresponding to the PRS measurement 1236, to the server 400.

At stages 1240, 1250, 1260, the location of the target UE 500-1 may be determined, e.g., using one or more positioning techniques discussed above based on one or more PRS measurements. The stages 1240, 1250, 1260 may be performed at different times, and one or more of the stages 1240, 1250, 1260 may be omitted from the flow 1200. Stage 1240 is for UE-based positioning and stages 1250, 1260 are for UE-assisted positioning. The TRP 300-1 may have an LMF to determine the location of the target UE 500-1 at stage 1250.

Figure 13:
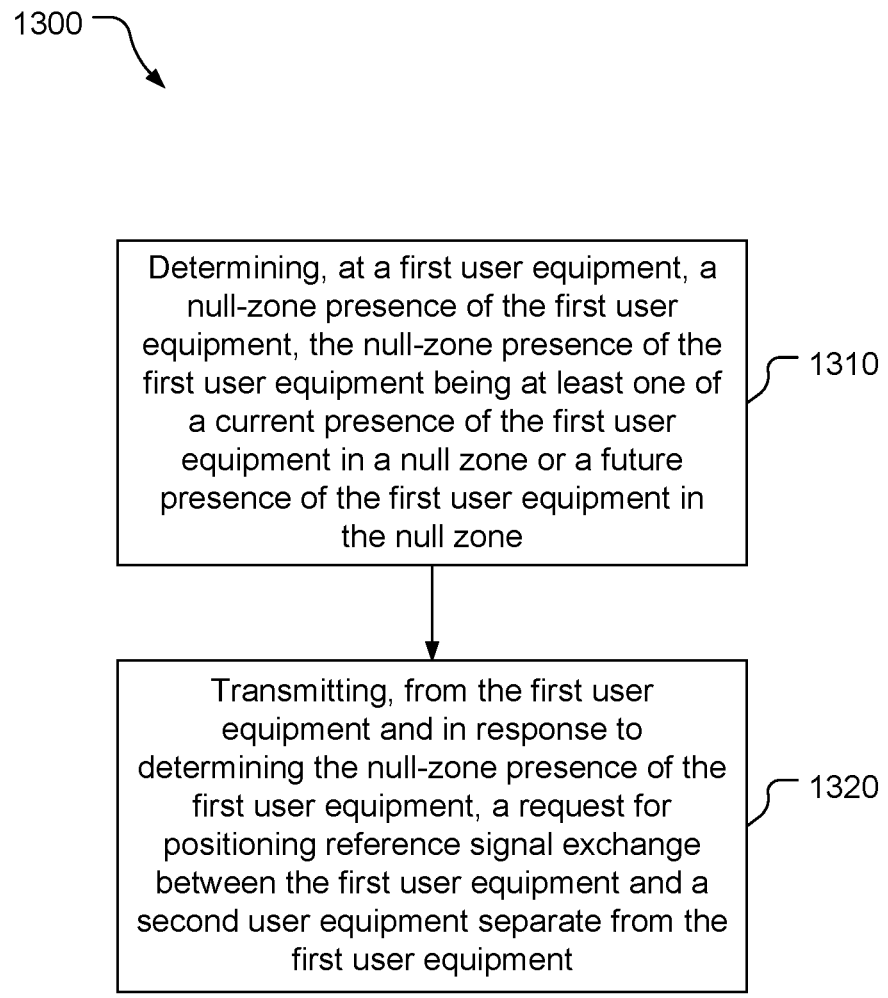
FIG. 13 is a block flow diagram of a method of initiating positioning reference signal exchange.

Referring to FIG. 13, with further reference to FIGS. 1-12, a method 1300 of initiating positioning reference signal exchange includes the stages shown. The method 1300 is, however, an example and not limiting of the disclosure. The method 1300 may be altered, e.g., by having stages added, removed, rearranged, combined, performed concurrently, and/or having single stages split into multiple stages.

At stage 1310, the method 1300 includes determining, at a first user equipment, a null-zone presence of the first user equipment, the null-zone presence of the first user equipment being at least one of a current presence of the first user equipment in a null zone or a future presence of the first user equipment in the null zone. For example, at stage 810 the target UE 500-1 may determine that the target UE 500-1 is or will be in the null zone 640. The UE 500-1 may determine the (current or future) null zone presence by analyzing positioning measurements to detect an anomaly, e.g., an outlier measurement or calculated position such that there is a change in positioning information of more than a threshold amount (e.g., within a threshold time). Alternatively, the UE 500-1 may determine presence in the null zone 640 by determining location, e.g., by dead reckoning, and comparing the determined location with a boundary of the null zone 640. Alternatively, the UE 500-1 may determine future null zone presence based on a location estimate for the UE 500-1, motion information regarding the UE 500-1 (e.g., velocity, trajectory), and a boundary of the null zone 640. The UE 500-1 may use this information to calculate future potential locations and determining whether any of those locations are inside the boundary of the null zone 640. Alternatively, the UE 500-1 may determine null zone presence by receiving an indication of null zone presence from another entity, e.g., the server 400. The other entity may determine null zone presence of the UE 500-1 in similar manners as the UE 500-1. Thus, either the UE 500-1 or a network entity may initiate UE-UE positioning. The processor 510, possibly the interface 520 (e.g., the wireless receiver 244 and the antenna 246), and possibly the memory 530 may comprise means for determining a null-zone presence of a UE.

At stage 1320, the method 1300 includes transmitting, from the first user equipment and in response to determining the null-zone presence of the first user equipment, a request for positioning reference signal exchange between the first user equipment and a second user equipment separate from the first user equipment. For example, the UE 500-1 may transmit an explicit or implicit request for UE-UE PRS exchange to the server 400 (e.g., the request message 822), the TRP 300-1 (e.g., the request message 821), and/or another UE (e.g., the request 831). The request sent to another UE may be for the other UE to relay the request to the TRP 300-1 or the server 400, or may be to negotiate UE-UE PRS exchange with the other UE. The request sent to another UE for relaying to the TRP 300-1 or the server 400 may result in UE-UE PRS exchange between the target UE 500-1 and yet another UE (i.e., a different UE than the UE to which the target UE 500-1 sent the request) such as the anchor UE 500-3 with the request sent to the anchor UE 500-2. The request may identify a prospective anchor UE. The processor 510, the interface 520 (e.g., the wireless transmitter 242 and the antenna 246), and the memory 530 may comprise means for transmitting a request for positioning reference signal exchange.

Implementations of the method 1300 may include one or more of the following features. In an example implementation, the method 1300 may include transmitting, from the first user equipment and in association with the request for positioning reference signal exchange, a capability of the first user equipment to at least one of measure sidelink positioning reference signals, transmit sidelink positioning reference signals, measure uplink positioning reference signals, or transmit downlink positioning reference signals. For example, the target UE 500-1 may send information regarding channels supported by the target UE 500-1 for UE-UE PRS exchange, available resources, etc. The processor 510, the interface 520 (e.g., the wireless transmitter 242 and the antenna 246), and the memory 530 may comprise means for sending a capability of the first UE. In another example implementation, the method 1300 may include performing the positioning reference signal exchange between the first UE and the second UE over a sidelink channel. For example, the target UE 500-1 and the anchor UE 500-2 may send, receive, and measure PRS from the target UE 500-1 and/or from the anchor UE 500-2 over a sidelink channel. The processor 510, the interface 520 (e.g., the wireless transmitter 242 and/or the wireless receiver 244 and the antenna 246), and the memory 530 may comprise means for performing the positioning reference signal exchange over a sidelink channel.

Also or alternatively, implementations of the method 1300 may include one or more of the following features. In an example implementation, the method 1300 may include reporting, from the first user equipment, a location estimate of the first user equipment and an indication of location uncertainty corresponding to the location estimate of the first user equipment to a network entity. For example, a UE may report to an entity, such as the TRP 300 and/or the server 400, location and location uncertainty such that the entity can mark a map with positioning uncertainties corresponding to locations. Similar information from other UEs may be collected to crowdsource the null-zone map. The entity may use multiple location and location uncertainty reports to develop null zone boundaries and thus a map with one or more null zones (a null-zone map). The processor 510, the interface 520 (e.g., the wireless transmitter 242 and the antenna 246), and the memory 530 may comprise means for reporting the location estimate and the indication of the location uncertainty. In another example implementation, the method 1300 may include: storing, at the first user equipment, a plurality of positioning-quality pairs each comprising a location estimate of the first user equipment and an indication of location uncertainty corresponding to the location estimate of the first user equipment; and determining, at the first user equipment, a boundary of the null zone based on the plurality of positioning-quality pairs. The target UE 500-1 may, for example, determine the boundary of the null zone 640 by determining and storing locations and corresponding location uncertainties, and thus may develop a null-zone map, e.g., with locations corresponding to high location uncertainties (above a threshold uncertainty) being in a null zone and locations corresponding to low location uncertainties (below the threshold uncertainty) being outside the null zone. The processor 510, the interface 520 (e.g., the wireless transmitter 242 and/or the wireless receiver 244 and the antenna 246), and the memory 530 may comprise means for storing a plurality of positioning-quality pairs and means for determining the boundary of the null zone.

Figure 14:
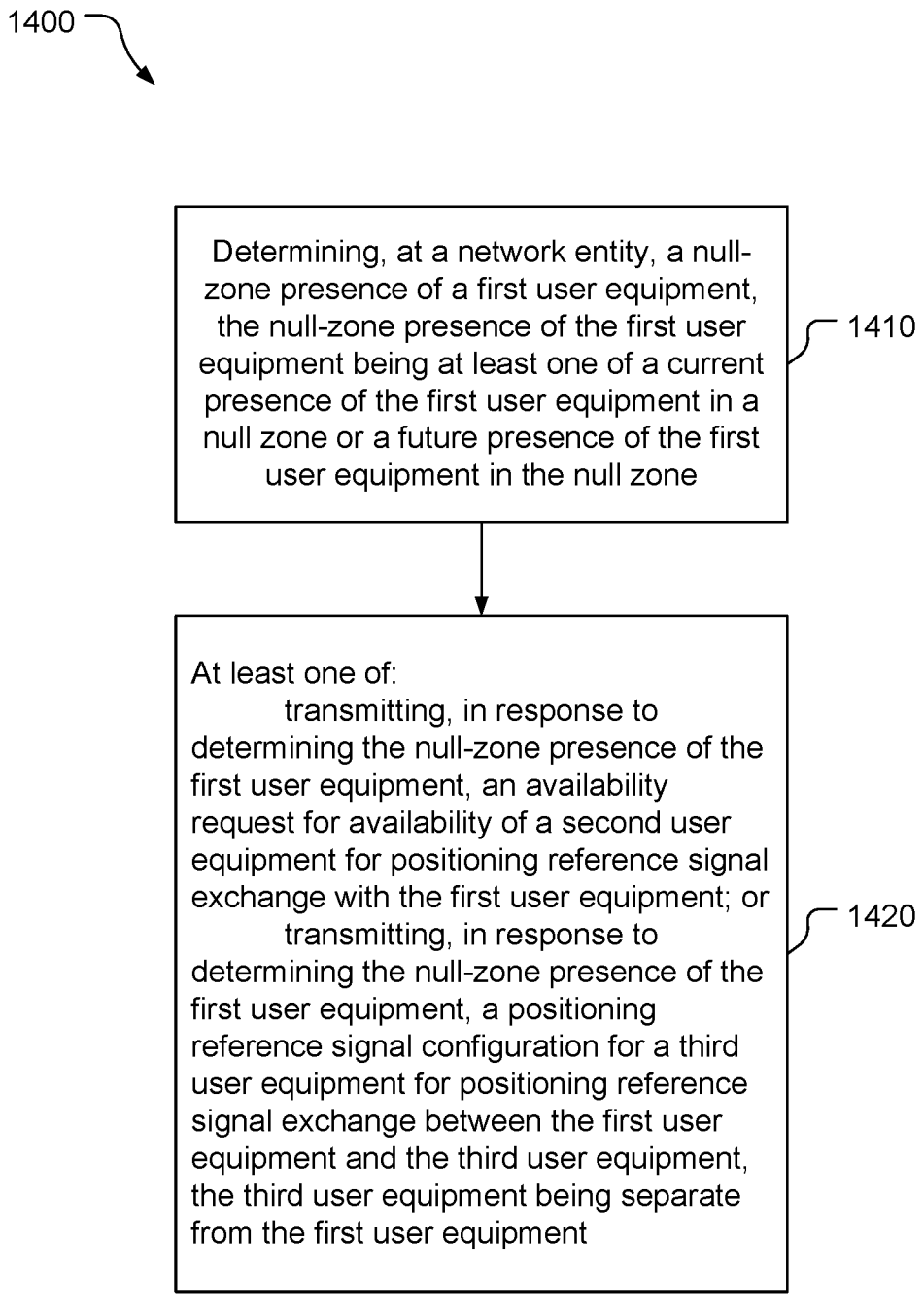
FIG. 14 is a block flow diagram of another method of initiating positioning reference signal exchange.

Referring to FIG. 14, with further reference to FIGS. 1-13, a method 1400 of initiating positioning reference signal exchange includes the stages shown. The method 1400 is, however, an example and not limiting of the disclosure. The method 1400 may be altered, e.g., by having stages added, removed, rearranged, combined, performed concurrently, and/or having single stages split into multiple stages.

At stage 1410, the method 1400 includes determining, at a network entity, a null-zone presence of a first user equipment, the null-zone presence of the first user equipment being at least one of a current presence of the first user equipment in a null zone or a future presence of the first user equipment in the null zone. For example, the server 400 (or the TRP 300, e.g., including an LMF) may determine null zone presence of the target UE 500-1, e.g., as discussed above with respect to stage 1310. The processor 410, the interface 420 (e.g., the wireless receiver 444 and the antenna 446), and the memory 411 may comprise means for determining a boundary of the null zone. Also or alternatively, the processor 310, the interface 320 (e.g., the wireless receiver 344 and the antenna 346), and the memory 311 may comprise means for determining a boundary of the null zone.

At stage 1420, the method 1400 includes at least one of: transmitting, in response to determining the null-zone presence of the first user equipment, an availability request for availability of a second user equipment for positioning reference signal exchange with the first user equipment; or transmitting, in response to determining the null-zone presence of the first user equipment, a positioning reference signal configuration for a third user equipment for positioning reference signal exchange between the first user equipment and the third user equipment, the third user equipment being separate from the first user equipment. For example, the server 400 (or the TRP 300) may request availability of one or more UEs for serving as one or more anchor UEs to exchange PRS with the target UE 500-1 and serve as reference points for use in determining the location of the target UE 500-1. Also or alternatively, the server 400 (or the TRP 300) may send PRS configuration to one or more anchor UEs to facilitate (or even enable) PRS exchange with the target UE 500-1, e.g., over a sidelink channel (or uplink channel or downlink channel). Thus, a positioning reference signal configuration may indicate to perform the positioning reference signal exchange with the first user equipment over a sidelink channel. The availability request may request availability of UEs generally, e.g., without identifying one or more specific UEs, or may identify one or more UEs. The availability request may be transmitted to request availability of the second user equipment for positioning reference signal exchange with the first user equipment over a sidelink channel. The positioning reference signal configuration may be sent after sending the availability request. The processor 410, the interface 420 (e.g., the wireless transmitter 442 and the antenna 446), and the memory 411 may comprise means for transmitting the availability request and/or means for sending a PRS configuration for a third UE. Also or alternatively, the processor 310, the interface 320 (e.g., the wireless transmitter 342 and the antenna 346), and the memory 311 may comprise means for transmitting the availability request and/or means for sending a PRS configuration for a third UE.

Implementations of the method 1400 may include one or more of the following features. In an example implementation, determining the null-zone presence of the first user equipment is based on a change in positioning information of more than a threshold amount (e.g., within a threshold amount of time). In another example implementation, determining the future presence of the first user equipment in the null zone is based on a location estimate of the first user equipment, motion of the first user equipment, and a boundary of the null zone, e.g., predicting whether the present velocity and/or trajectory will land the first user equipment in the null zone. In another example implementation, determining the null-zone presence of the first user equipment is based on a positioning reference signal exchange request received from the first user equipment, the positioning reference signal exchange request requesting positioning reference signal exchange between the first user equipment and another user equipment. For example, the target UE 500-1 may request UE-UE PRS exchange explicitly or implicitly (e.g., with an indication of (current or future) null-zone presence of the target UE 500-1). Analysis of PRS exchanged based on the request may indicate whether the first user equipment is in or will be in the null zone. In another example implementation, the positioning reference signal configuration may be sent only to a serving base station of the first user equipment in response to receiving, absent the processor sending the availability request, an indication of availability of at least one (e.g., the third) user equipment for positioning reference signal exchange with the first user equipment. For example, if the server 400 receives anchor UE availability from the TRP 300-1 (e.g., that gathered anchor UE availability from one or more other TRPs) without requesting anchor UE availability from the TRP 300-1, then the server 400 may send the PRS configuration only to the TRP 300-1, which may then send the PRS configuration to one or more other TRPs 300.

Also or alternatively, implementations of the method 1400 may include one or more of the following features. In an example implementation, the availability request is transmitted and the method 1400 comprises transmitting a respective positioning reference signal configuration to each of a plurality of second UEs in response to receiving an availability response to the availability request, the availability response identifying the plurality of second UEs. The processor 410, the interface 420 (e.g., the wireless transmitter 442 and the antenna 446), and the memory 411 may comprise means for transmitting the respective PRS configuration. Also or alternatively, the processor 310, the interface 320 (e.g., the wireless transmitter 342 and the antenna 346), and the memory 311 may comprise means for transmitting the respective PRS configuration. In another example implementation, the availability request is transmitted, with the availability request identifying the second user equipment. For example, the server 400 may identify one or more UEs that are close to the target UE 500-1, or have a likelihood of LOS with the target UE 500-1 above a threshold likelihood, etc.

Implementation Examples

Implementation examples are provided in the following numbered clauses.

1. A first user equipment configured for wireless signal exchange, the first user equipment comprising:
a transceiver;
a memory; and
a processor, communicatively coupled to the transceiver and the memory, and configured to:
determine a null-zone presence of the first user equipment, the null-zone presence of the first user equipment being at least one of a current presence of the first user equipment in a null zone or a future presence of the first user equipment in the null zone; and
transmit, via the transceiver in response to determining the null-zone presence of the first user equipment, a request for positioning reference signal exchange between the first user equipment and a second user equipment separate from the first user equipment.

2. The first user equipment of claim 1, wherein the processor is configured to send the request for positioning reference signal exchange at least one of to the second user equipment, to a network entity, or to a third user equipment.

3. The first user equipment of claim 1, wherein the processor is configured to determine the null-zone presence of the first user equipment based on a change in positioning information of more than a threshold amount.

4. The first user equipment of claim 1, wherein the processor is configured to determine the future presence of the first user equipment in the null zone based on a location estimate of the first user equipment, motion of the first user equipment, and a boundary of the null zone.

5. The first user equipment of claim 1, wherein the processor is configured to transmit, in association with the request for positioning reference signal exchange, a capability of the first user equipment to at least one of measure sidelink positioning reference signals, transmit sidelink positioning reference signals, measure uplink positioning reference signals, or transmit downlink positioning reference signals.

6. The first user equipment of claim 1, wherein the processor is configured to report a location estimate of the first user equipment and an indication of location uncertainty corresponding to the location estimate of the first user equipment to a network entity.

7. The first user equipment of claim 1, wherein the processor is configured to:
store a plurality of positioning-quality pairs each comprising a location estimate of the first user equipment and an indication of location uncertainty corresponding to the location estimate of the first user equipment; and
determine a boundary of the null zone based on the plurality of positioning-quality pairs.

8. The first user equipment of claim 1, wherein the processor is configured to perform the positioning reference signal exchange with the second user equipment over a sidelink channel via the transceiver.

9. The first user equipment of claim 1, wherein the request for positioning reference signal exchange identifies the second user equipment.

10. A first user equipment configured for wireless signal exchange, the first user equipment comprising:
means for determining a null-zone presence of the first user equipment, the null-zone presence of the first user equipment being at least one of a current presence of the first user equipment in a null zone or a future presence of the first user equipment in the null zone; and
means for transmitting, in response to determining the null-zone presence of the first user equipment, a request for positioning reference signal exchange between the first user equipment and a second user equipment separate from the first user equipment.

11. The first user equipment of claim 10, wherein the means for transmitting the request comprise means for transmitting the request for positioning reference signal exchange at least one of to the second user equipment, to a network entity, or to a third user equipment.

12. The first user equipment of claim 10, wherein the means for determining the null-zone presence of the first user equipment comprise means for determining the null-zone presence of the first user equipment based on a change in positioning information of more than a threshold amount.

13. The first user equipment of claim 10, wherein the means for determining the null-zone presence of the first user equipment comprise means for determining the future presence of the first user equipment in the null zone based on a location estimate of the first user equipment, motion of the first user equipment, and a boundary of the null zone.

14. The first user equipment of claim 10, further comprising means for transmitting, in association with the request for positioning reference signal exchange, a capability of the first user equipment to at least one of measure sidelink positioning reference signals, transmit sidelink positioning reference signals, measure uplink positioning reference signals, or transmit downlink positioning reference signals.

15. The first user equipment of claim 10, further comprising means for reporting a location estimate of the first user equipment and an indication of location uncertainty corresponding to the location estimate of the first user equipment to a network entity.

16. The first user equipment of claim 10, further comprising:
   means for storing a plurality of positioning-quality pairs each comprising a location estimate of the first user equipment and an indication of location uncertainty corresponding to the location estimate of the first user equipment; and
   means for determining a boundary of the null zone based on the plurality of positioning-quality pairs.

17. The first user equipment of claim 10, further comprising means for performing the positioning reference signal exchange with the second user equipment over a sidelink channel.

18. The first user equipment of claim 10, wherein the request for positioning reference signal exchange identifies the second user equipment.

19. A method of initiating positioning reference signal exchange, the method comprising:
   determining, at a first user equipment, a null-zone presence of the first user equipment, the null-zone presence of the first user equipment being at least one of a current presence of the first user equipment in a null zone or a future presence of the first user equipment in the null zone; and
   transmitting, from the first user equipment and in response to determining the null-zone presence of the first user equipment, a request for positioning reference signal exchange between the first user equipment and a second user equipment separate from the first user equipment.

20. The method of claim 19, wherein the request for positioning reference signal exchange is transmitted at least one of to the second user equipment, to a network entity, or to a third user equipment.

21. The method of claim 19, wherein determining the null-zone presence of the first user equipment is based on a change in positioning information of more than a threshold amount.

22. The method of claim 19, wherein determining the null-zone presence of the first user equipment comprises determining the future presence of the first user equipment in the null zone based on a location estimate of the first user equipment, motion of the first user equipment, and a boundary of the null zone.

23. The method of claim 19, further comprising transmitting, from the first user equipment and in association with the request for positioning reference signal exchange, a capability of the first user equipment to at least one of measure sidelink positioning reference signals, transmit sidelink positioning reference signals, measure uplink positioning reference signals, or transmit downlink positioning reference signals.

24. The method of claim 19, further comprising reporting, from the first user equipment, a location estimate of the first user equipment and an indication of location uncertainty corresponding to the location estimate of the first user equipment to a network entity.

25. The method of claim 19, further comprising:
   storing, at the first user equipment, a plurality of positioning-quality pairs each comprising a location estimate of the first user equipment and an indication of location uncertainty corresponding to the location estimate of the first user equipment; and
   determining, at the first user equipment, a boundary of the null zone based on the plurality of positioning-quality pairs.

26. The method of claim 19, further comprising performing the positioning reference signal exchange between the first user equipment and the second user equipment over a sidelink channel.

27. The method of claim 19, wherein the request for positioning reference signal exchange identifies the second user equipment.

28. A non-transitory, processor-readable storage medium comprising processor-readable instructions configured to cause a processor of a first user equipment, in order to initiate positioning reference signal exchange, to:
   determine a null-zone presence of the first user equipment, the null-zone presence of the first user equipment being at least one of a current presence of the first user equipment in a null zone or a future presence of the first user equipment in the null zone; and
   transmit, in response to determining the null-zone presence of the first user equipment, a request for positioning reference signal exchange between the first user equipment and a second user equipment separate from the first user equipment.

29. The storage medium of claim 28, wherein the processor-readable instructions configured to cause the processor to transmit the request comprise processor-readable instructions configured to cause the processor to transmit the request for positioning reference signal exchange at least one of to the second user equipment, to a network entity, or to a third user equipment.

30. The storage medium of claim 28, wherein the processor-readable instructions configured to cause the processor to determine the null-zone presence of the first user equipment comprise processor-readable instructions configured to cause the processor to determine the null-zone presence of the first user equipment based on a change in positioning information of more than a threshold amount.

31. The storage medium of claim 28, wherein the processor-readable instructions configured to cause the processor to determine the null-zone presence of the first user equipment comprise processor-readable instructions configured to cause the processor to determine the future presence of the first user equipment in the null zone based on a location estimate of the first user equipment, motion of the first user equipment, and a boundary of the null zone.

32. The storage medium of claim 28, further comprising processor-readable instructions configured to cause the processor to transmit, in association with the request for positioning reference signal exchange, a capability of the first user equipment to at least one of measure sidelink positioning reference signals, transmit sidelink positioning reference signals, measure uplink positioning reference signals, or transmit downlink positioning reference signals.

33. The storage medium of claim 28, further comprising processor-readable instructions configured to cause the processor to report a location estimate of the first user equipment and an indication of location uncertainty corresponding to the location estimate of the first user equipment to a network entity.

34. The storage medium of claim 28, further comprising processor-readable instructions configured to cause the processor to:
store a plurality of positioning-quality pairs each comprising a location estimate of the first user equipment and an indication of location uncertainty corresponding to the location estimate of the first user equipment; and
determine a boundary of the null zone based on the plurality of positioning-quality pairs.

35. The storage medium of claim 28, further comprising processor-readable instructions configured to cause the processor to perform the positioning reference signal exchange with the second user equipment over a sidelink channel.

36. The storage medium of claim 28, wherein the request for positioning reference signal exchange identifies the second user equipment.

37. A network entity comprising:
a transceiver;
a memory; and
a processor, communicatively coupled to the transceiver and the memory, and configured to:
determine a null-zone presence of a first user equipment, the null-zone presence of the first user equipment being at least one of a current presence of the first user equipment in a null zone or a future presence of the first user equipment in the null zone; and
at least one of:
transmit, via the transceiver in response to determining the null-zone presence of the first user equipment, an availability request for availability of a second user equipment for positioning reference signal exchange with the first user equipment; or
transmit, via the transceiver in response to determining the null-zone presence of the first user equipment, a positioning reference signal configuration for a third user equipment for positioning reference signal exchange between the first user equipment and the third user equipment, the third user equipment being separate from the first user equipment.

38. The network entity of claim 37, wherein the positioning reference signal configuration indicates to the third user equipment to perform the positioning reference signal exchange with the first user equipment over a sidelink channel.

39. The network entity of claim 37, wherein the processor is configured to transmit the availability request to request availability of the second user equipment for positioning reference signal exchange with the first user equipment over a sidelink channel.

40. The network entity of claim 37, wherein the processor is configured to determine the null-zone presence of the first user equipment based on a change in positioning information of more than a threshold amount.

41. The network entity of claim 37, wherein the processor is configured to determine the future presence of the first user equipment in the null zone based on a location estimate of the first user equipment, motion of the first user equipment, and a boundary of the null zone.

42. The network entity of claim 37, wherein the processor is configured to determine the null-zone presence of the first user equipment based on a positioning reference signal exchange request received from the first user equipment via the transceiver, the positioning reference signal exchange request requesting positioning reference signal exchange between the first user equipment and another user equipment.

43. The network entity of claim 37, wherein the processor is configured to transmit the positioning reference signal configuration only to a serving base station of the first user equipment in response to receiving, absent the processor transmitting the availability request, an indication of availability of at least one user equipment for positioning reference signal exchange with the first user equipment.

44. The network entity of claim 37, wherein the processor is configured to transmit the availability request and to transmit a respective positioning reference signal configuration to each of a plurality of second user equipments in response to receiving an availability response to the availability request, the availability response identifying the plurality of second user equipments.

45. The network entity of claim 37, wherein the processor is configured to transmit the availability request, with the availability request identifying the second user equipment.

46. A network entity comprising:
determining means for determining a null-zone presence of a first user equipment, the null-zone presence of the first user equipment being at least one of a current presence of the first user equipment in a null zone or a future presence of the first user equipment in the null zone; and
at least one of:
first transmitting means for transmitting, in response to determining the null-zone presence of the first user equipment, an availability request for availability of a second user equipment for positioning reference signal exchange with the first user equipment; or
second transmitting means for transmitting, in response to determining the null-zone presence of the first user equipment, a positioning reference signal configuration for a third user equipment for positioning reference signal exchange between the first user equipment and the third user equipment, the third user equipment being separate from the first user equipment.

47. The network entity of claim 46, wherein the positioning reference signal configuration indicates to the third user equipment to perform the positioning reference signal exchange with the first user equipment over a sidelink channel.

48. The network entity of claim 46, wherein the network entity comprises the first transmitting means, and wherein the first transmitting means comprise means for transmitting the availability request to request availability of the second user equipment for positioning reference signal exchange with the first user equipment over a sidelink channel.

49. The network entity of claim 46, wherein the determining means comprise means for determining the null-zone presence of the first user equipment based on a change in positioning information of more than a threshold amount.

50. The network entity of claim 46, wherein the determining means comprise means for determining the future presence of the first user equipment in the null zone based on a location estimate of the first user equipment, motion of the first user equipment, and a boundary of the null zone.

51. The network entity of claim 46, wherein the determining means comprise means for determining the null-zone presence of the first user equipment based on a positioning reference signal exchange request received from the first user equipment, the positioning reference signal exchange request requesting positioning reference signal exchange between the first user equipment and another user equipment.

52. The network entity of claim 46, wherein the network entity comprises the second transmitting means, and wherein the second transmitting means comprise means for transmitting the positioning reference signal configuration only to a serving base station of the first user equipment in response to receiving, absent the first sending means sending the availability request, an indication of availability of at least one user equipment for positioning reference signal exchange with the first user equipment.

53. The network entity of claim 46, wherein the network entity comprises the first transmitting means, and wherein the network entity further comprises means for transmitting a respective positioning reference signal configuration to each of a plurality of second user equipments in response to receiving an availability response to the availability request, the availability response identifying the plurality of second user equipments.

54. The network entity of claim 46, wherein the network entity comprises the first transmitting means, and wherein the availability request identifies the second user equipment.

55. A method for initiating positioning reference signal exchange, the method comprising:
  determining, at a network entity, a null-zone presence of a first user equipment, the null-zone presence of the first user equipment being at least one of a current presence of the first user equipment in a null zone or a future presence of the first user equipment in the null zone; and
  at least one of:
    transmitting, in response to determining the null-zone presence of the first user equipment, an availability request for availability of a second user equipment for positioning reference signal exchange with the first user equipment; or
    transmitting, in response to determining the null-zone presence of the first user equipment, a positioning reference signal configuration for a third user equipment for positioning reference signal exchange between the first user equipment and the third user equipment, the third user equipment being separate from the first user equipment.

56. The method of claim 55, wherein the method comprises transmitting the positioning reference signal configuration, and wherein the positioning reference signal configuration indicates to perform the positioning reference signal exchange with the first user equipment over a sidelink channel.

57. The method of claim 55, wherein the method comprises transmitting the availability request to request availability of the second user equipment for positioning reference signal exchange with the first user equipment over a sidelink channel.

58. The method of claim 55, wherein determining the null-zone presence of the first user equipment is based on a change in positioning information of more than a threshold amount.

59. The method of claim 55, wherein determining the future presence of the first user equipment in the null zone is based on a location estimate of the first user equipment, motion of the first user equipment, and a boundary of the null zone.

60. The method of claim 55, wherein determining the null-zone presence of the first user equipment is based on a positioning reference signal exchange request received from the first user equipment, the positioning reference signal exchange request requesting positioning reference signal exchange between the first user equipment and another user equipment.

61. The method of claim 55, wherein the method comprises transmitting the positioning reference signal configuration only to a serving base station of the first user equipment in response to receiving, absent the first sending means sending the availability request, an indication of availability of at least one user equipment for positioning reference signal exchange with the first user equipment.

62. The method of claim 55, wherein the method comprises transmitting the availability request and the method further comprises transmitting a respective positioning reference signal configuration to each of a plurality of second user equipments in response to receiving an availability response to the availability request, the availability response identifying the plurality of second user equipments.

63. The method of claim 55, wherein the method comprises transmitting the availability request, with the availability request identifying the second user equipment.

64. A non-transitory, processor-readable storage medium comprising processor-readable instructions configured to cause a processor of a network entity, in order to initiate positioning reference signal exchange, to:
  determine a null-zone presence of a first user equipment, the null-zone presence of the first user equipment being at least one of a current presence of the first user equipment in a null zone or a future presence of the first user equipment in the null zone; and
  at least one of:
    transmit, in response to determining the null-zone presence of the first user equipment, an availability request for availability of a second user equipment for positioning reference signal exchange with the first user equipment; or
    transmit, in response to determining the null-zone presence of the first user equipment, a positioning reference signal configuration for a third user equipment for positioning reference signal exchange between the first user equipment and the third user equipment, the third user equipment being separate from the first user equipment.

65. The storage medium of claim 64, wherein the positioning reference signal configuration indicates to perform the positioning reference signal exchange with the first user equipment over a sidelink channel.

66. The storage medium of claim 64, wherein the storage medium comprises the processor-readable instructions configured to cause the processor to transmit the availability request, and wherein the availability request requests availability of the second user equipment for positioning reference signal exchange with the first user equipment over a sidelink channel.

67. The storage medium of claim 64, wherein the processor-readable instructions configured to cause the processor to determine the null-zone presence of the first user equipment comprise processor-readable instructions configured to cause the processor to determine the null-zone presence of the first user equipment based on a change in positioning information of more than a threshold amount.

68. The storage medium of claim 64, wherein the processor-readable instructions configured to cause the processor to determine the null-zone presence of the first user equipment comprise processor-readable instructions configured to cause the processor to determine the future presence of the first user equipment in the null zone based on a location estimate of the first user equipment, motion of the first user equipment, and a boundary of the null zone.

69. The storage medium of claim 64, wherein the processor-readable instructions configured to cause the processor to determine the null-zone presence of the first user equipment comprise processor-readable instructions configured to cause the processor to determine the null-zone presence of the first user equipment based on a positioning reference signal exchange request received from the first user equipment, the positioning reference signal exchange request requesting positioning reference signal exchange between the first user equipment and another user equipment.

70. The storage medium of claim 64, wherein the storage medium comprises the processor-readable instructions configured to cause the processor to transmit the positioning reference signal, and wherein the processor-readable instructions configured to cause the processor to transmit the positioning reference signal comprise processor-readable instructions configured to cause the processor to transmit the positioning reference signal configuration only to a serving base station of the first user equipment in response to receiving, absent the processor sending the availability request, an indication of availability of at least one user equipment for positioning reference signal exchange with the first user equipment.

71. The storage medium of claim 64, wherein the storage medium comprises the processor-readable instructions configured to cause the processor to transmit the availability request and further comprises processor-readable instructions configured to cause the processor to transmit a respective positioning reference signal configuration to each of a plurality of second user equipments in response to receiving an availability response to the availability request, the availability response identifying the plurality of second user equipments.

72. The storage medium of claim 64, wherein the storage medium comprises the processor-readable instructions configured to cause the processor to transmit the availability request, and wherein the availability request identifies the second user equipment.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first user equipment configured for wireless signal transfer, the first user equipment comprising:
   a transceiver;
   a memory; and
   a processor, communicatively coupled to the transceiver and the memory, and configured to:
      determine a future null-zone presence of the first user equipment based on a location estimate of the first user equipment, motion of the first user equipment, and a boundary of a null zone, the future null-zone presence of the first user equipment being a future presence of the first user equipment in the null zone; and
      transmit, via the transceiver in response to determining the future null-zone presence of the first user equipment, a request for positioning reference signal transfer between the first user equipment and a second user equipment separate from the first user equipment.

2. The first user equipment of claim 1, wherein the processor is configured to send the request for positioning reference signal transfer to at least one of the second user equipment, a network entity, or a third user equipment.

3. The first user equipment of claim 1, wherein the processor is configured to determine a current null-zone presence of the first user equipment based on a change in positioning information of more than a threshold amount.

4. The first user equipment of claim 1, wherein the processor is configured to transmit, in association with the request for positioning reference signal transfer, a capability of the first user equipment to at least one of measure sidelink positioning reference signals, transmit sidelink positioning reference signals, measure uplink positioning reference signals, or transmit downlink positioning reference signals.

5. The first user equipment of claim 1, wherein the processor is configured to:
   store a plurality of positioning-quality pairs each comprising a location estimate of the first user equipment and an indication of location uncertainty corresponding to the location estimate of the first user equipment; and
   determine the boundary of the null zone based on the plurality of positioning-quality pairs.

6. The first user equipment of claim 1, wherein the request for positioning reference signal transfer identifies the second user equipment.

7. A first user equipment configured for wireless signal transfer, the first user equipment comprising:
   means for determining a future null-zone presence of the first user equipment based on a location estimate of the first user equipment, motion of the first user equipment, and a boundary of a null zone, the future null-zone presence of the first user equipment being a future presence of the first user equipment in the null zone; and
   means for transmitting, in response to determining the future null-zone presence of the first user equipment, a request for positioning reference signal transfer between the first user equipment and a second user equipment separate from the first user equipment.

8. The first user equipment of claim 7, wherein the means for transmitting the request comprise means for transmitting the request for positioning reference signal transfer to at least one of second user equipment, a network entity, or a third user equipment.

9. The first user equipment of claim 7, further comprising means for determining a current null-zone presence of the first user equipment based on a change in positioning information of more than a threshold amount.

10. The first user equipment of claim 7, further comprising means for transmitting, in association with the request for positioning reference signal transfer, a capability of the first user equipment to at least one of measure sidelink positioning reference signals, transmit sidelink positioning reference signals, measure uplink positioning reference signals, or transmit downlink positioning reference signals.

11. The first user equipment of claim 7, further comprising:
- means for storing a plurality of positioning-quality pairs each comprising a location estimate of the first user equipment and an indication of location uncertainty corresponding to the location estimate of the first user equipment; and
- means for determining the boundary of the null zone based on the plurality of positioning-quality pairs.

12. The first user equipment of claim 7, wherein the request for positioning reference signal transfer identifies the second user equipment.

13. A method of initiating positioning reference signal transfer, the method comprising:
- determining, at a first user equipment, a future null-zone presence of the first user equipment based on a location estimate of the first user equipment, motion of the first user equipment, and a boundary of a null zone, the future null-zone presence of the first user equipment being a future presence of the first user equipment in the null zone; and
- transmitting, from the first user equipment and in response to determining the future null-zone presence of the first user equipment, a request for positioning reference signal transfer between the first user equipment and a second user equipment separate from the first user equipment.

14. The method of claim 13, wherein the request for positioning reference signal transfer is transmitted to at least one of the second user equipment, a network entity, or a third user equipment.

15. The method of claim 13, further comprising determining a present null-zone presence of the first user equipment based on a change in positioning information of more than a threshold amount.

16. The method of claim 13, further comprising transmitting, from the first user equipment and in association with the request for positioning reference signal transfer, a capability of the first user equipment to at least one of measure sidelink positioning reference signals, transmit sidelink positioning reference signals, measure uplink positioning reference signals, or transmit downlink positioning reference signals.

17. The method of claim 13, further comprising:
- storing, at the first user equipment, a plurality of positioning-quality pairs each comprising a location estimate of the first user equipment and an indication of location uncertainty corresponding to the location estimate of the first user equipment; and
- determining, at the first user equipment, the boundary of the null zone based on the plurality of positioning-quality pairs.

18. The method of claim 13, wherein the request for positioning reference signal transfer identifies the second user equipment.

19. A non-transitory, processor-readable storage medium comprising processor-readable instructions configured to cause a processor of a first user equipment, in order to initiate positioning reference signal transfer, to:
- determine a future null-zone presence of the first user equipment based on a location estimate of the first user equipment, motion of the first user equipment, and a boundary of a null zone, the future null-zone presence of the first user equipment being a future presence of the first user equipment in the null zone; and
- transmit, in response to determining the null-zone presence of the first user equipment, a request for positioning reference signal transfer between the first user equipment and a second user equipment separate from the first user equipment.

20. The non-transitory, processor-readable storage medium of claim 19, wherein the processor-readable instructions configured to cause the processor to transmit the request comprise processor-readable instructions configured to cause the processor to transmit the request for positioning reference signal transfer to at least one of the second user equipment, a network entity, or a third user equipment.

21. The non-transitory, processor-readable storage medium of claim 19, further comprising processor-readable instructions configured to cause the processor to determine a current null-zone presence of the first user equipment based on a change in positioning information of more than a threshold amount.

22. The non-transitory, processor-readable storage medium of claim 19, further comprising processor-readable instructions configured to cause the processor to transmit, in association with the request for positioning reference signal transfer, a capability of the first user equipment to at least one of measure sidelink positioning reference signals, transmit sidelink positioning reference signals, measure uplink positioning reference signals, or transmit downlink positioning reference signals.

23. The non-transitory, processor-readable storage medium of claim 19, further comprising processor-readable instructions configured to cause the processor to:
- store a plurality of positioning-quality pairs each comprising a location estimate of the first user equipment and an indication of location uncertainty corresponding to the location estimate of the first user equipment; and
- determine the boundary of the null zone based on the plurality of positioning-quality pairs.

24. The non-transitory, processor-readable storage medium of claim 19, wherein the request for positioning reference signal transfer identifies the second user equipment.

* * * * *